(12) United States Patent
Sinharoy

(10) Patent No.: US 6,877,089 B2
(45) Date of Patent: Apr. 5, 2005

(54) BRANCH PREDICTION APPARATUS AND PROCESS FOR RESTORING REPLACED BRANCH HISTORY FOR USE IN FUTURE BRANCH PREDICTIONS FOR AN EXECUTING PROGRAM

(75) Inventor: Balaram Sinharoy, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 576 days.

(21) Appl. No.: 09/748,841

(22) Filed: Dec. 27, 2000

(65) Prior Publication Data

US 2002/0083312 A1 Jun. 27, 2002

(51) Int. Cl.[7] .............................................. G06F 9/00
(52) U.S. Cl. ..................................................... 712/239
(58) Field of Search ............................... 712/228, 233, 712/234, 238, 239, 240

(56) References Cited

U.S. PATENT DOCUMENTS

| | | | |
|---|---|---|---|
| 5,669,001 A | 9/1997 | Moreno ....................... | 395/706 |
| 5,699,536 A | 12/1997 | Hopkins et al. ............. | 395/392 |
| 5,887,159 A * | 3/1999 | Burrows ....................... | 712/226 |
| 6,108,775 A * | 8/2000 | Shiell et al. ................. | 712/240 |
| 6,427,192 B1 * | 7/2002 | Roberts ....................... | 711/133 |

FOREIGN PATENT DOCUMENTS

EP        798632 A2 * 10/1997 ............. G06F/9/38

OTHER PUBLICATIONS

Handy, "The Cache Memory Book, 2nd Edition," 1998, pp. 18–19.*

(Continued)

Primary Examiner—Eddie Chan
Assistant Examiner—David J Huisman
(74) Attorney, Agent, or Firm—Lynn L. Augspurger; Bernard M. Goldman

(57) ABSTRACT

Apparatus and methods implemented in a processor semiconductor logic chip for providing novel "hint instructions" that uniquely preserve and reuse branch predictions replaced in a branch history table (BHT). A branch prediction is lost in the BHT after its associated instruction is replaced in an instruction cache. The unique "hint instructions" are generated and stored in a unique instruction cache which associates each hint instruction with a line of instructions. The hint instructions contains the latest branch history for all branch instructions executed in an associated line of instructions, and they are stored in the instruction cache during instruction cache hits in the associated line. During an instruction cache miss in an instruction line, the associated hint instruction is stored in a second level cache with a copy of the associated instruction line being replaced in the instruction cache. In the second level cache, the copy of the line is located through the instruction cache directory entry associated with the line being replaced in the instruction cache. Later, the hint instruction can be retrieved into the instruction cache when its associated instruction line is fetched from the second level cache, and then its associated hint instruction is also retrieved and used to restore the latest branch predictions for that instruction line. In the prior art this branch prediction would have been lost. It is estimated that this invention improves program performance for each replaced branch prediction by about 80%, due to increasing the probability of BHT bits correctly predicting the branch paths in the program from about 50% to over 90%. Each incorrect BHT branch prediction may result in the loss of many execution cycles, resulting in additional instruction re-execution overhead when incorrect branch paths are belatedly discovered.

3 Claims, 14 Drawing Sheets

OTHER PUBLICATIONS

E. Rotenberg, S. Bennett and J. Smith, Trace Cache: a Low Latency Approach to High Bandwidth Instruction Fetching, Apr. 11, 1996, pp. 1–48.

T. M. Conte, K. N. Menezes, P. M. Mills and B. A. Patel, "Optimization of Instruction Fetch Mechanisms for High Issue Rates," in Proceedings of the 22nd Annual International Symposium on Computer Architecture, (Santa Margherita, Italy), Jun. 1995, pp. 333–344.

Tse–Yu Yeh, D. Marr and Y. Patt, "Increasing the Instruction Fetch Rate Via Multiple Branch Prediction and a branch Address Cache," Procedings of the 7th ACM International Conference on Supercomputing, Jul. 1993, pp. 67–76.

J. E. Smith, A Study of Branch Prediction Strategies, in 8th Annual International Symposium of Computer Architecture, ACM, 1981, pp. 202–215.

Tse–Yu Yeh and Y. Patt, "A Comparison of Dynamic Branch Predictors That Use Two Levels of Branch History", in 20th Annual International Symposium of Computer Architecture, ACM, 1993, pp. 257–266.

T. Ball and J R. Larus, "Branch Prediction for Free", in 1993 SIGPLAN Conference on Programming Languages Design and Implementation, ACM, Jun. 1993, pp. 1–28.

* cited by examiner

BRANCH INFORMATION QUEUE (BIQ)

BHT

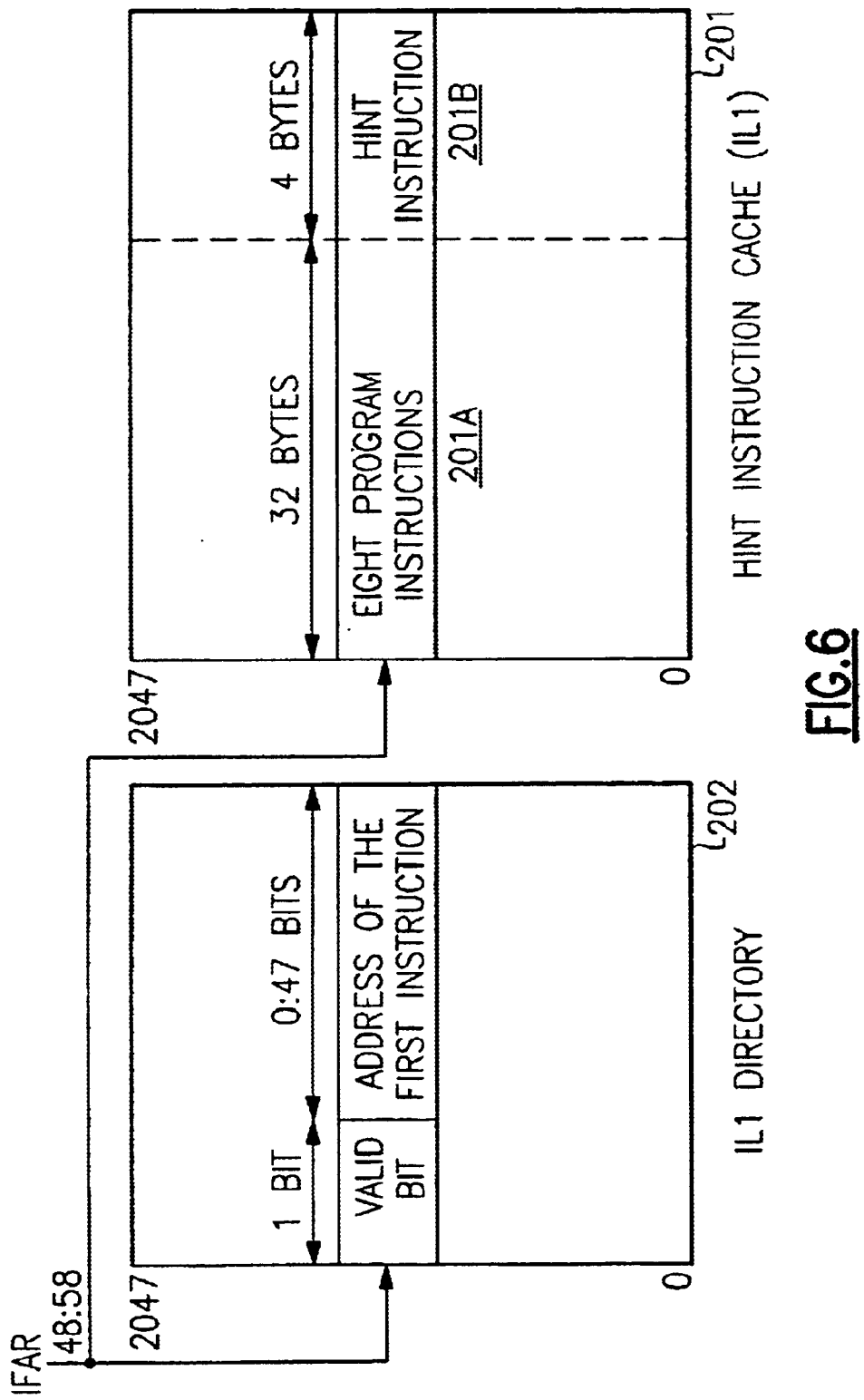

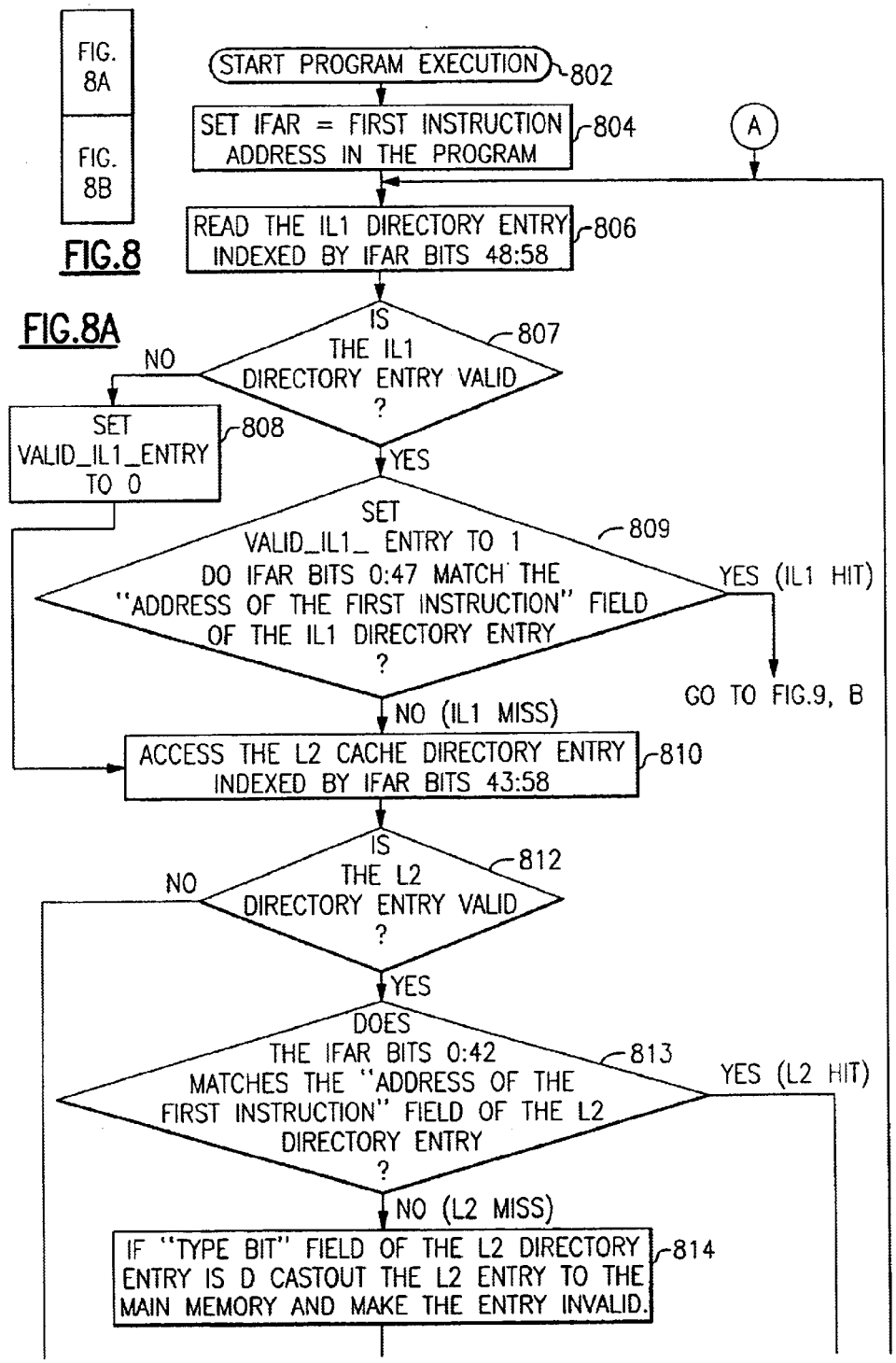

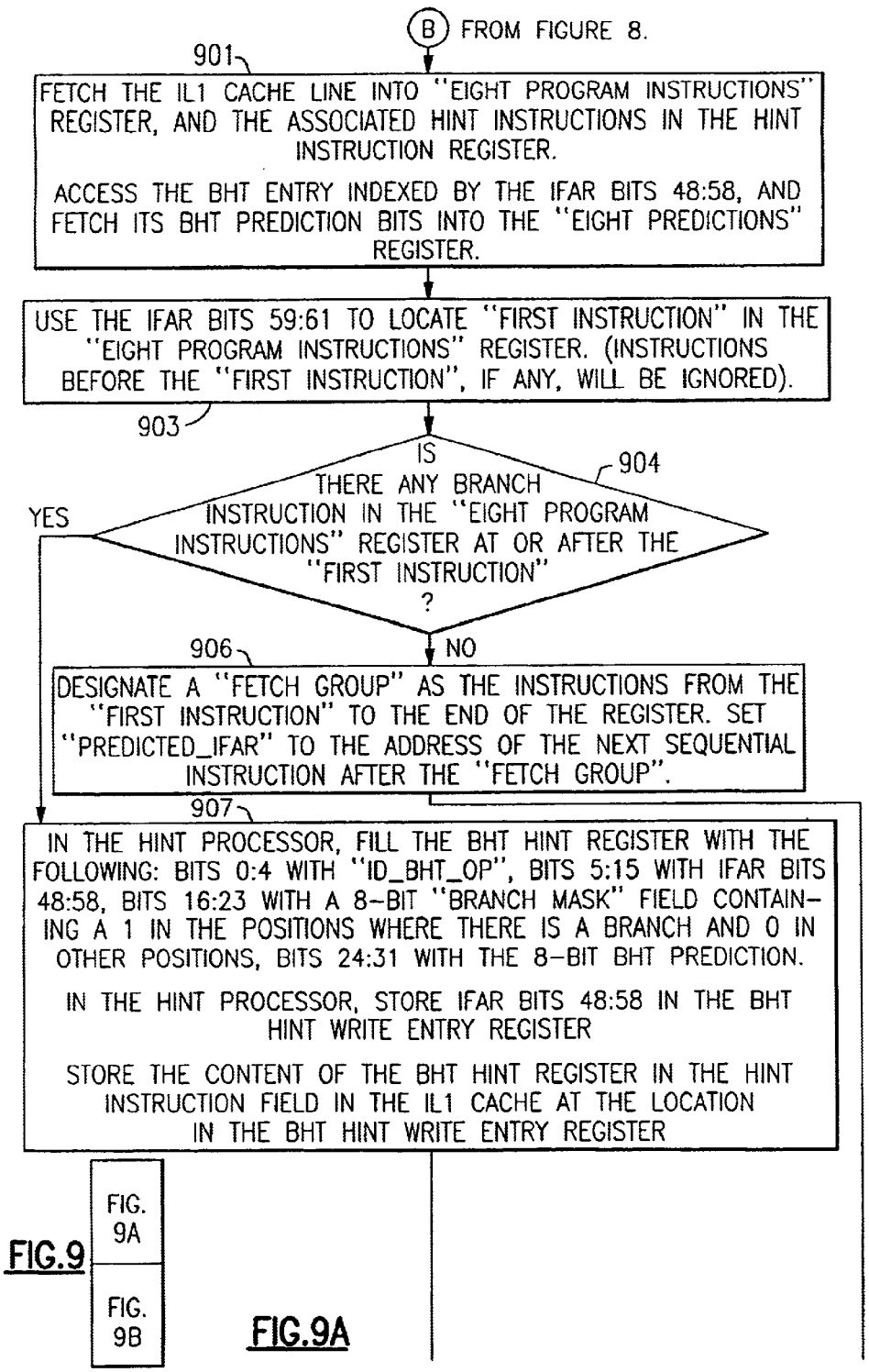

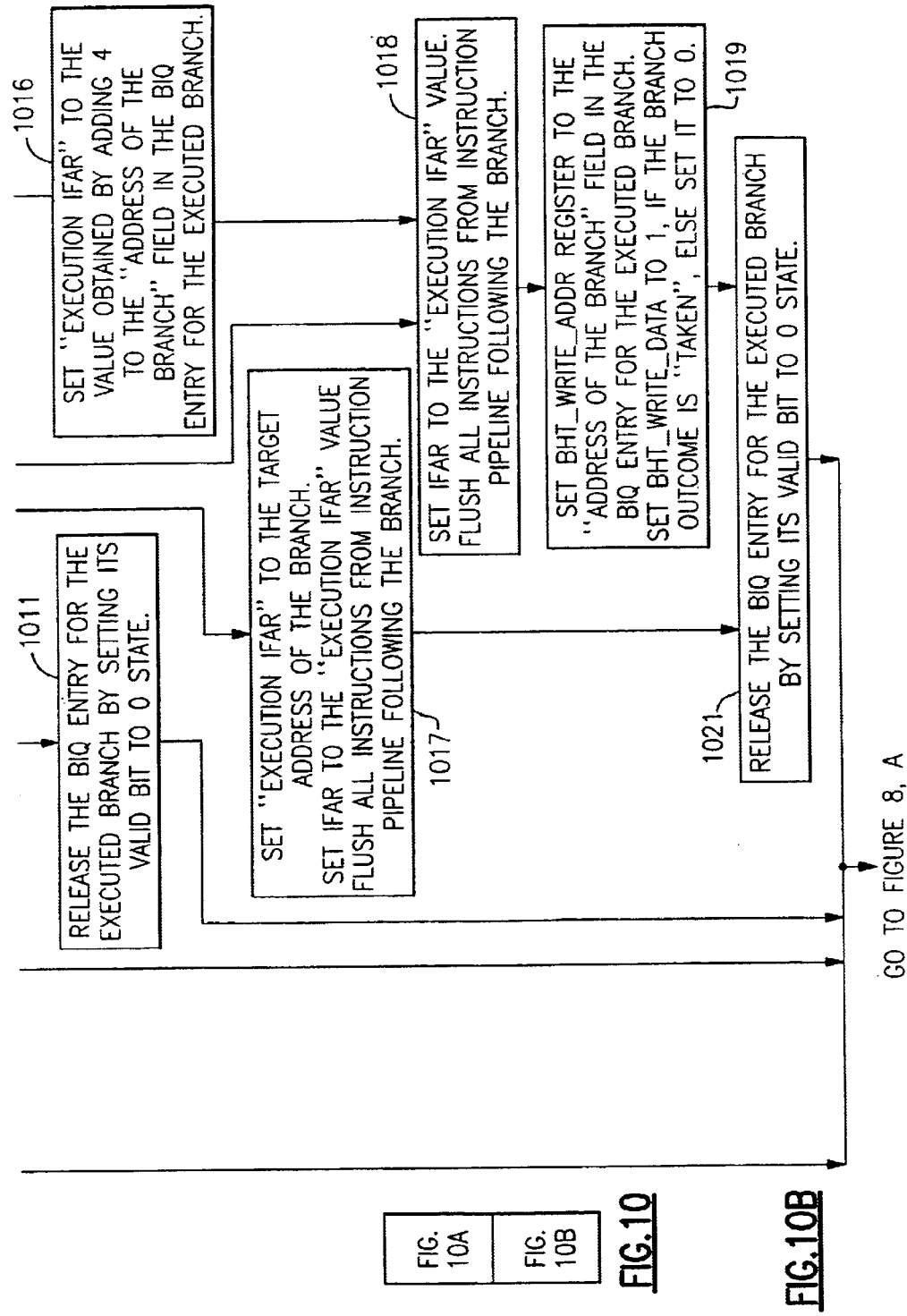

BRANCH PREDICTION APPARATUS AND PROCESS FOR RESTORING REPLACED BRANCH HISTORY FOR USE IN FUTURE BRANCH PREDICTIONS FOR AN EXECUTING PROGRAM

This invention deals with novel process and novel apparatus features which may be embodied in a single chip processor for significantly improving processor performance by enabling the restoration of branch predictions previously lost in a branch history table.

TECHNICAL FIELD

The present invention generally deals with increasing program execution performance by processor semiconductor logic chips. The improvement is obtained by uniquely preserving and enabling the reuse of branch history in a branch history table (BHT) for associated instructions replaced in an instruction cache (I-cache) of a processor. Prior branch prediction techniques using branch history tables have lost the branch history associated with instruction lines replaced in an instruction cache.

INCORPORATION BY REFERENCE

Incorporated by reference herein is the entire specification, including all disclosure and drawings, of application having U.S. Ser. No. 09/436,264 filed on Nov. 8, 1999 entitled "Increasing the Overall Prediction Accuracy for Multi-Cycle Branch Prediction Processes and Apparatus by Enabling Quick Recovery" invented by the inventor of the present application, now U.S. Pat. No. 6,598,152, granted Jul. 22, 2003.

BACKGROUND

In prior art computer systems using branch history tables (BHTs), each BHT entry contains fields that predict the taken or not taken branch path for each branch Instruction in an associated line of instructions in an instruction cache (I-cache). Each line of instructions contains N number of instruction locations, and each of the N instruction locations may contain any type of instruction, e.g. a branch instruction or a non-branch instruction. There are N number of BHT fields in any BHT entry respectively associated with the N instruction locations in the associated I-cache line. Each BHT field may be comprised of one or more bits, and is sometimes referred to as a counter field. In the detailed example described herein, each BHT field comprises a single bit.

Any distribution of instruction types may exist in any I-cache line. Accordingly, a line of instructions within any I-cache entry may contain no branch instruction, or any combination of branch and non-branch instructions. For example, each I-cache entry may comprise an instruction line with 8 locations, and each of these eight instruction locations may contain an unconditional branch instruction, a conditional branch instruction, a non-branch instruction, or any other type of instruction. Thus, any distribution of instruction types may exist in any I-cache line. For example, the I-cache may have 32 K line entries. The I-cache index locates both an I-cache entry in the I-cache and an associated BHT entry in the BHT. Further, each BHT entry contains 8 BHT fields (e.g. bits) which are respectively associated with the 8 instruction locations in the associated I-cache entry. The only BHT bits in the BHT entry which are predictively effective are those associated with a branch Instruction location, and the BHT bits associated with instruction locations containing non-branch instructions are ignored. For example, a BHT entry having a BHT bit set to a "1" state is predicting that a branch instruction in its associated location will be "taken", i.e. jump to a non-sequential instruction location on its next execution in the program. A "0" state for this BHT bit predicts its associated conditional branch instruction will be "not taken", i.e. go to the next sequential instruction location in the program. A BHT bit associated with an unconditional branch instruction is always set to the "1" state to indicate it is always "taken". The state of a BHT bit associated with a non-branch instruction is ignored, regardless of whether it has a "1" or "0" state.

In the prior art, a new line of instructions may be fetched from an L2 cache into an I-cache entry and replace a line of instructions previously stored in that I-cache entry. However, the BHT entry associated with that I-cache entry is not replaced in the BHT when the instruction line is replaced in the I-cache entry. Whatever BHT prediction states exist in the BHT entry are assumed to be the predictions for the branch-instruction(s) in the newly fetched line, even though the new line probably has branch instructions in different locations than the replaced I-cache line, and even though the existing BHT predictions may have been generated for other branch instructions in the program. Hence, the BHT predictions for a replaced line have a significant chance of providing wrong predictions for the branch instructions in the line.

When a BHT prediction selects the wrong branch path in the program, a sequence of incorrect instructions are selected and executed, because the selection of the wrong branch path is not immediately detected, but is detected many instruction execution cycles later. After detection, instruction results for these wrong instructions are destroyed, and the branch path is belatedly reset to the correct branch path from which the program execution continues, and the wrong BHT branch prediction is corrected in the BHT. Hence, wrong BHT predictions may cause significant time loss during program execution due to their selection of incorrect branch paths. This increase in the program execution time causes a corresponding reduction in the processing rate of executing programs. The resetting of wrong branch paths and the correction of BHT erroneous predictions is taught in the U.S. Pat. No. 6,598,152, granted Jul. 22, 2003.

The statistical probability of BHT predictions being incorrect for a replaced line is variable. For example, if a newly fetched instruction line replaces a branch instruction with an unrelated branch instruction in the same I-cache location, the existing setting of its location associated BHT prediction Is expected to have a 50 percent probability of being correct (and a 50 percent chance of being wrong). But if the new branch Instruction in the newly fetched line replaces a non-branch instruction, and if this newly fetched instruction was the last branch instruction previously in that instruction location, its location-associated BHT prediction has better than a 90 percent probability of being correct.

In the known prior art of BHT branch prediction techniques, the predictions in the branch history table were lost when associated branch instructions were replaced in the I-cache. The subject invention may be used with some of these prior BHT branch prediction systems to improve their BHT prediction rates.

SUMMARY OF THE INVENTION

This invention increases the speed at which a processor can execute a program by increasing the accuracy of its BHT branch predictions. This increases the processing speed of a program (even when there is no change in the instruction execution cycle time of the processor) by preventing the loss of previously-generated BHT predictions (which were lost in the prior art after replacement of associated branch instructions in the I-cache). For example, this invention may increase the BUT branch prediction accuracy for a branch instruction refetched to the same location in an I-cache entry—by increasing its probability of correctness from a potential 50 percent rate to in excess of a 90 percent rate. This is better than an 80 percent improvement in the prediction accuracy for branch instructions refetched in an I-cache, i.e. computed as (90–50)/50=80.

When an I-cache line of read-only instructions Is replaced in an I-cache, there is no castout of the replaced line because it has a copy available in the storage hierarchy for being refetched later into the I-cache. Also associated with that I-cache instruction line is a BHT entry which is not castout but may contain predictions that do not correctly predict the "taken or not taken" outcome of one or more branch instructions in the refetched line.

With this invention, when a line of instructions is replaced in the I-cache, the current state of its associated BHT entry is stored in a hint instruction in the I-cache. Later, the hint instruction is stored in the system storage hierarchy in association with a copy of the replaced I-cache instruction line. Also stored in that hint instruction are: a branch mask indicating the locations of any branch instructions within the replaced I-cache line.

In the detailed embodiment described herein, an associated hint instruction is generated and stored in the I-cache when the associated line is accessed therein. When the line is later replaced in the I-cache, its hint instruction is then stored in a second level cache in association with a copy of the replaced I-cache instruction line. This invention may be used in hierarchy levels below the second level cache, such as a third level represented by the main memory of a system. When this invention is not extended to a third hierarchy level, the hint instruction is lost when its associated instruction line is replaced in the second level cache. Nevertheless, this invention is highly useful when it is only extended to the second level in the hierarchy, because line replacement in a large second level cache is rare. Extension to one or more additional storage levels is an economic tradeoff, whereby the cost of extension to a next hierarchy levels may be outweighed by the low frequency of instruction line refetches at the lower hierarchy levels involving only a very small increase in program execution efficiency, such a fraction of 1 percent. However, the subject invention comprehends the transfer and storage of hint instructions to one or more storage levels beyond the second level cache in the system storage hierarchy.

In more detail, during an I-cache hit a hint instruction Is generated and stored with Its Instruction line in a row of the I-cache to associate the hint instruction and the I-cache instruction line. When an I-cache miss occurs for the instruction line, the hint instruction is transferred from the I-cache to a row in the L2 cache containing the L2 copy of the associated instruction line. Then the I-cache line and its hint instruction are replaced by another instruction line and hint instruction copied from a row in the L2 cache located by the current instruction address (in IFAR). The replacing hint instruction will be a developed (generated) hint instruction if its L2 copy was previously used during the current execution of its program, i.e. the line is being fetched again (i.e. refetched) into the I-cache—then its associated hint Instruction is fetched and used to restore predictions in the current BHT entry for branch instructions in the refetched line. This BHT entry restoration process does not affect its BHT bits corresponding to non-branch instructions in the refetched line. Thus, the restoration can only affect BHT predictability for branch instructions in the newly fetched instruction line and does not affect the predictability of BHT bits associated with non-branch instructions in the associated instruction line. A "branch mask" in the hint instruction aids in the restoration by indicating the locations of any branch instructions in its associated instruction line.

Thus, the number of restored bit positions in a BHT entry is dependent on the number of branch instructions in the associated replaced line, and the branch instruction locations in the line are indicated by the branch mask in the hint instruction. If all instruction positions in a replace line contain branch instructions, all predictions in the associated BHT entry may be restored by this invention. But if less than all predictions in the associated BHT entry contain branch instructions, less than all BHT fields in the associated BHT entry are restored by this invention. Most instruction lines have less than all of its locations containing branch instructions, and some instruction lines have no branch instructions.

In the described embodiment, each hint instruction contains an operation code (op code) to identify a developed hint instruction, which contains a BHT index (bht_index) that locates the associated BHT entry In the BHT, a branch mask (branch_mask), and a BHT entry (bht_bits) which stores a copy of the BHT entry having the BHT states existing when its associated instruction line was replaced in the I-cache. The branch mask has a "1" mask bit at each BHT field position associated with a branch instruction position in the associated instruction line. A "0" mask bit is provided at each branch mask position corresponding to a non-branch instruction position in the associated instruction line. In a restored BHT entry, the only changeable BHT positions correspond to the "1" positions in the branch mask. During the restoration process, each BHT field position in the BHT entry located at a corresponding "11 state mask-bit position is set to the state of the corresponding prediction position in the BHT field (bht_bits) stored within the same hint instruction. In the BHT entry, no change is made to each BHT field position located by a "0" state mask-bit position.

Consequently, this invention allows the "0" mask bit positions in a restored BHT entry to represent predictions made for branch instruction(s) in different instruction lines that may later be refetched into the associated I-cache entry, as long as those branch instruction(s) are at non-branch locations in the currently replaced instruction line.

Accordingly, the process of this invention increases BHT prediction accuracy by enabling each BHT entry for a refetched instruction line to restore only the BHT predictions for the branch instruction positions in the refetched line. The avoidance of changing BHT predictions at non-branch instruction positions in a restored BHT entry has the useful benefit of allowing the non-branch BHT positions to retain predictions previously made for another instruction line that may in the future be refetched. This allows a restored BHT entry to retain predictions for multiple different instruction lines when such predictions are located at BHT positions which will not be used by any instruction in the currently associated line.

Novel apparatus is described in the detailed embodiment to support this inventive process by modifying both the I-cache and the second-level cache to receive and store hint instructions in association with instruction lines stored therein. This is done in both the first level I-cache and the second level cache by structuring each row in each cache to store both an instruction line and an associated hint instruction. The hint instruction location in each row is initialized by storing therein a "no operation" (NOP) type of hint instruction. This may be done by using a NOP code in the operation code field of a hint instruction and ignoring all other fields in the NOP instruction when It is detected as a NOP. The first time during a program execution an instruction line is fetched into the I-cache from the L2 cache in response to a current cache miss, the accessed L2 cache row will have been initialized with a NOP hint instruction, and this instruction line and its NOP are copied into the I-cache row having the current cache miss. The NOP may contain all "0" states in its "branch_mask" and "bht bits" fields to prevent any restoration in the associated BHT entry at this time. However, if this instruction line thereafter has an I-cache hit, a real hint instruction (in the form described above) is generated and stored over the NOP hint instruction in the associated I-cache row. Later when this I-cache line has a miss, this real hint instruction is copied from the I-cache row to overlay the corresponding NOP hint instruction in the L2 cache row containing a copy of the instruction line having the cache miss. Then the line and hint instruction are replaced in that I-ache entry. Then during the continuing execution of the program, this L2 stored hint instruction is available to restore its associated BHT entry when and if its associated instruction line is refetched from the L2 cache into the I-cache. The restored BHT entry fields then have the benefit of using the latest prediction for their associated instructions, thus having a greater chance of representing a correct BHT prediction.

Hence, it is the primary object of this invention to reduce the occurrence of wrong BHT predictions for a program by the restoration of BHT predictions lost in an I-cache by replacement of instruction lines therein without affecting associated BHT predictions which cannot be currently used. The invention increases processor execution speed by expanding the amount of branch history available to an executing program beyond the prediction capacity of the BHT, and this invention makes the replaced branch history quickly available from another level of the system storage hierarchy for later use during execution of a program.

The restoration process of this invention may overlap the normal operation of standard cache operations so that little or no processor execution time need be lost when this invention is used.

This invention discloses and claims novel "hint instruction" micro-control processes and apparatus which can operate in parallel with the normal program instruction processing controls of a processor to enable BHT predictions for replaced branch history to be stored in a usable form at another level in a storage hierarchy from which it can be quickly retrieved and used by an executing program. The micro-controls disclosed and claimed as part of this invention are preferably embedded in, and part of, the same semiconductor chip that contains the processor executing the program. Novel "hint instructions" are generated and used by the novel processes disclosed and claimed herein in these the micro-controls.

The hint instructions may operate transparent to a program executed with conventional program instructions, while hint instructions are being concurrently generated and executed by the "hint processing" micro-controls in the same chip as the processor executing the program.

Both an instruction line and an associated hint instruction may be stored in the same row of an L1 cache and an L2 cache. The L1 and/or L2 cache structure may be designed using separate subarrays, one subarray for storing the program instruction lines (i.e. in a "instruction cache" subarray), and the other subarray for storing the associated hint instructions (i.e. in a "hint instruction" subarray). This modified structure may have the advantage of enabling each subarray to have a bit width that is a power of 2, which is a design preference with some cache designers. Then the line index for selecting a line in the cache subarray would also be used to select the associated hint instruction in the "hint instruction" subarray. Part of the same IFAR address selects the BHT entry in a separate BHT subarray.

In the detailed embodiment described herein, the term "hint instruction cache (HIC)" is generally used to identify a novel I-cache in which each row stores both an instruction line and its associated hint Instruction.

Thus, this invention provides a novel hint instruction having novel controls using novel hardware and novel processes, which enable the saving and fast utilization of branch history for instructions replaced in an I-cache—to store their branch history elsewhere in the storage hierarchy, which if lost would require the inefficient process of resetting more wrongly-selected branch paths and belatedly redeveloped BHT predictions to replace the lost BHT predictions.

BRIEF DESCRIPTION OF THE DRAWINGS

FIG. 6 shows the general form of the novel hint instruction cache (IL1) and its instruction cache Directory (IL1 Dir) shown in FIGS. 2 and 3.

DESCRIPTION OF THE DETAILED EMBODIMENT

The detailed embodiment described herein has novel processor hardware shown in block form in FIGS. 2, 2A, 3, 4, 5, 6 and 7, which may be structured on a processor chip, and FIGS. 8, 9, 10, 11, 12 and 13 represent the detailed novel process and novel subprocesses performed by the illustrated hardware.

Figure 2B:
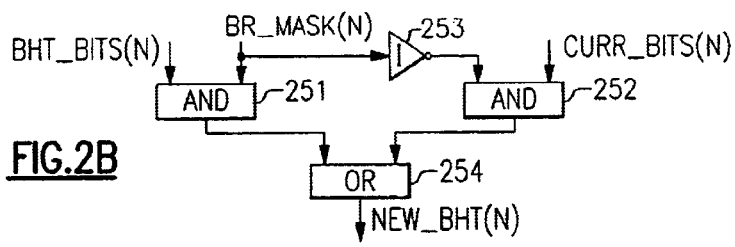
FIG. 2B represents the hardware logic of the "new BHT creation logic" circuits in FIG. 2A.
Figure 2:
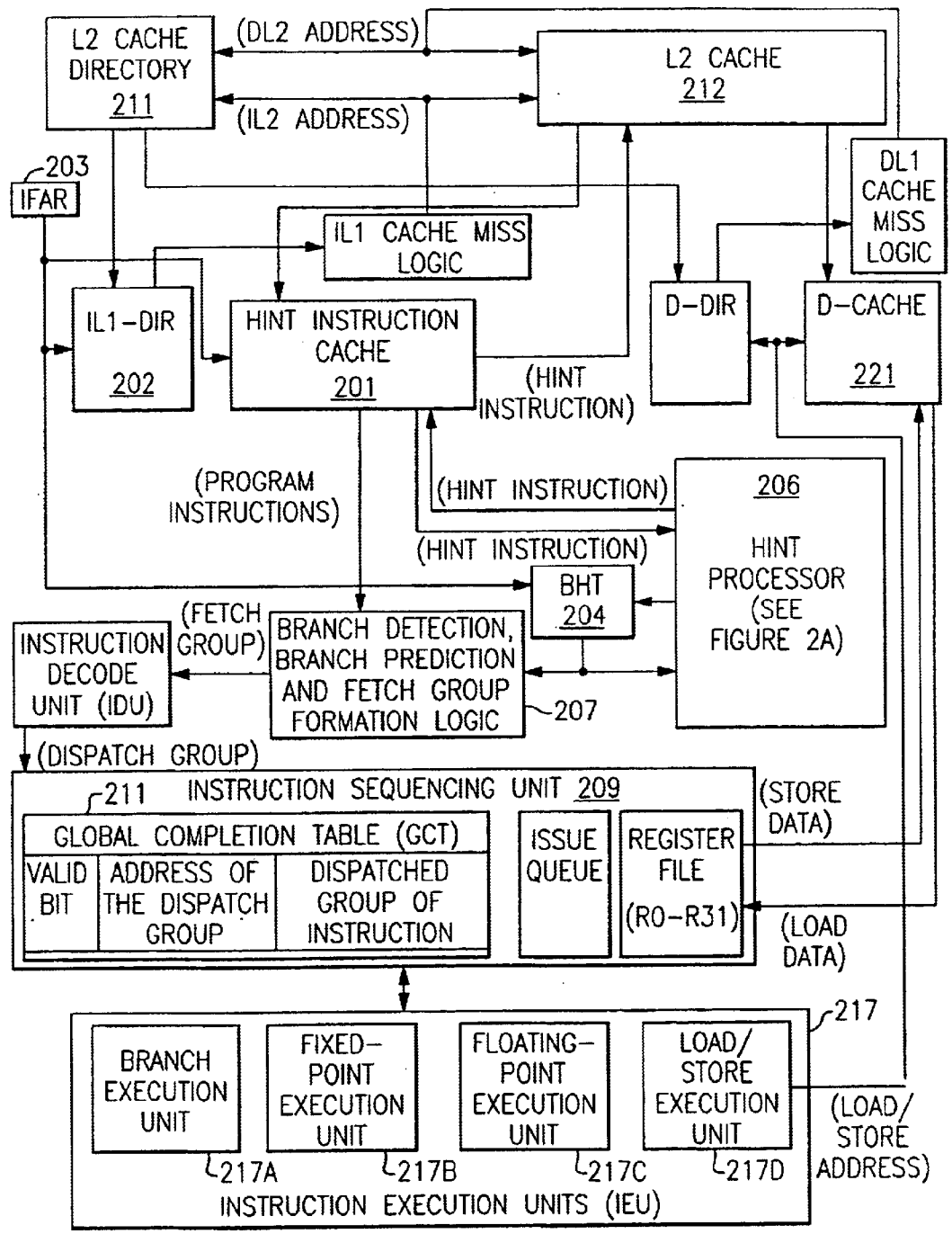
FIG. 2 shows an overview of instruction execution controls in a processor having the novel hint instructions and processes shown in the other FIGUREs for the detailed embodiment.

FIG. 2 includes a novel hint instruction cache (IL1) 201 and a novel L2 cache 212, each capable of containing a multiplicity of novel hint instructions, and conventional program instructions. Program instructions are fetched from the L2 cache 212 into the instruction cache (IL1) 201 for execution by the program currently being executed In the processor. The hint Instructions in L2 cache 212 and in IL1 201 are each located in a respective row containing a line of instructions. In each cache, an association is obtained between an instruction line and a hint instruction by their being placed in the same cache row.

Either real addresses, or virtual addresses translated in the conventional manner by the processor, may be used by the executing program to address program instructions and data in a main storage of the processor system, and in each of the caches through their respective cache directories in the conventional manner. Any size virtual addresses may be used, such as 64 bit or 32 bit addresses.

Figure 1:
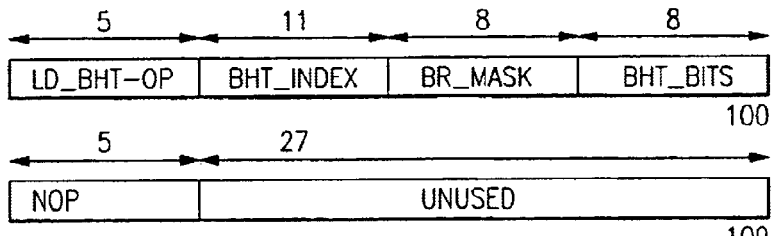
FIG. 1 illustrates the hint instruction form used in the described embodiment of the subject invention.

FIG. 1 shows the form of each hint instruction 100 and NOP hint instruction 109 stored in caches 201 and 212 in FIG. 2. The hint instructions are each shown as a 32 bit instruction. The hint instructions may operate within the processor in a manner transparent to the executing program.

NOP (non-operational) instruction 109 is used for initializing the space to be occupied by a hint instruction 100, and the NOP format contains only the NOP code in the first 5 bits of the instruction and its remaining bits are unused. Hint instruction 100 has a load BHT operation code in its five bit positions 0–4 labeled "ld_bht op". The NOP instruction type is used in the described embodiment to initialize storage space which later may be filled with the "ld_bht op" load" hint instructions. In this embodiment, the load BHT hint instruction and the NOP instruction are each 4 bytes long, i.e. 32 bits. The length of each field in these instructions are indicated by dimension arrows in each of the instructions in FIG. 1, and each dimension arrow is labeled with a centered bit number to indicate the bit length of its respective field. Thus, instruction 100 includes the five bit "ld_bht op" field, an eleven bit "bht_index" field, an eight bit "branch mask" field (br_mask), and an eight bit "bht_bits" field. As previously stated, the "ld_bht op" field is the operation code of instruction 100. The bits in the "bht_index" field provide the 48:58 index to locate and associate an IL1 cache entry (containing an instruction line), its IL1 directory entry, and their associated BHT entry. The "branch mask" field contains 8 bits, and each branch mask bit corresponds to a respective one of the 8 instruction locations in the associated instruction line. A mask bit is set to the "1" state to indicate when its respective instruction location contains a branch instruction, and is set to the "0" state to indicate when its respective IL1 instruction location does not contain a branch instruction. The "bht_bits" field stores the content of a BHT entry located at the "bht_index" in the BHT for the BHT entry associated with an instruction line being replace in the IL1 cache.

Each hint instruction is generated and stored in the hint instruction location identified by the current IFAR address, when the associated instruction line in IL1 cache 201 is being accessed with a cache hit.

A hint instruction is executed when its associated instruction line has a cache miss in the IL1. Then, the associated hint instruction is used to change the associated BHT entry if the associated instruction line has any branch instruction(s). The change in the associated BHT entry is only at a BHT bit located at a "branch mask" bit position having a "1" state (indicating the corresponding instruction is a branch instruction), if the "branch mask" has any "1" bit. Then, only the "1" mask bit position(s) are located in the current BHT entry where they are set to the "1" or "0" bit state of the corresponding bit position in the "bht_bits" field of the hint instruction, i.e. only at the "1" mask bit position(s) in the BHT entry. The "0" mask bit locations in the associated BHT entry are not affected by the process of executing the associated hint instruction.

During an IL1 cache miss, the associated hint instruction stored in the IL1 cache 201 is copied to the L2 cache immediately before the associated instruction line in the IL1 cache 201 is overlayed in the IL1 cache by a new instruction line fetched from the L2 cache. The L2 location for this hint instruction is generated from the content of the associated IL1 directory entry, i.e. from a "address of the first instruction" field that indicates the address of the first instruction to be executed in the associated instruction line.

Generally, a NOP instruction marks an entry location in the L2 cache which does not contain any IL1 replaced entry. That is, a NOP indicates an L2 entry which may contain a copy of an instruction line that have not been replaced in IL1 201, although it may have been copied into the IL1 cache where it currently exists. A NOP instruction is overlayed by a newly generated "Ld_bht" instruction when its corresponding IL1 location is first used in the IL1 cache 201.

An IL1 index 48:58 is used to locate a row of IL1 instructions in IL1 201 and its corresponding IL1 directory entry in directory entry 202. The IL1 index is obtained from the eleven address bit positions 48 through 58 (i.e. 48:58) in IFAR 203 in FIG. 2. The rows in the IL1 cache is shown divided into two sections 201A and 201B (FIG. 3) which respectively contain the instruction lines and the hint instructions. However, these sections may instead be obtained by using separate hardware subarrays which are accessed with the same index 48:58. The value of the 11 bits obtained from the sequence of address bit positions 48:58 locates one of 2048 rows in IL1 201 and also locates the corresponding row in IL1 directory 202 to associate the IFAR address with these two selected rows.

Figure 3:
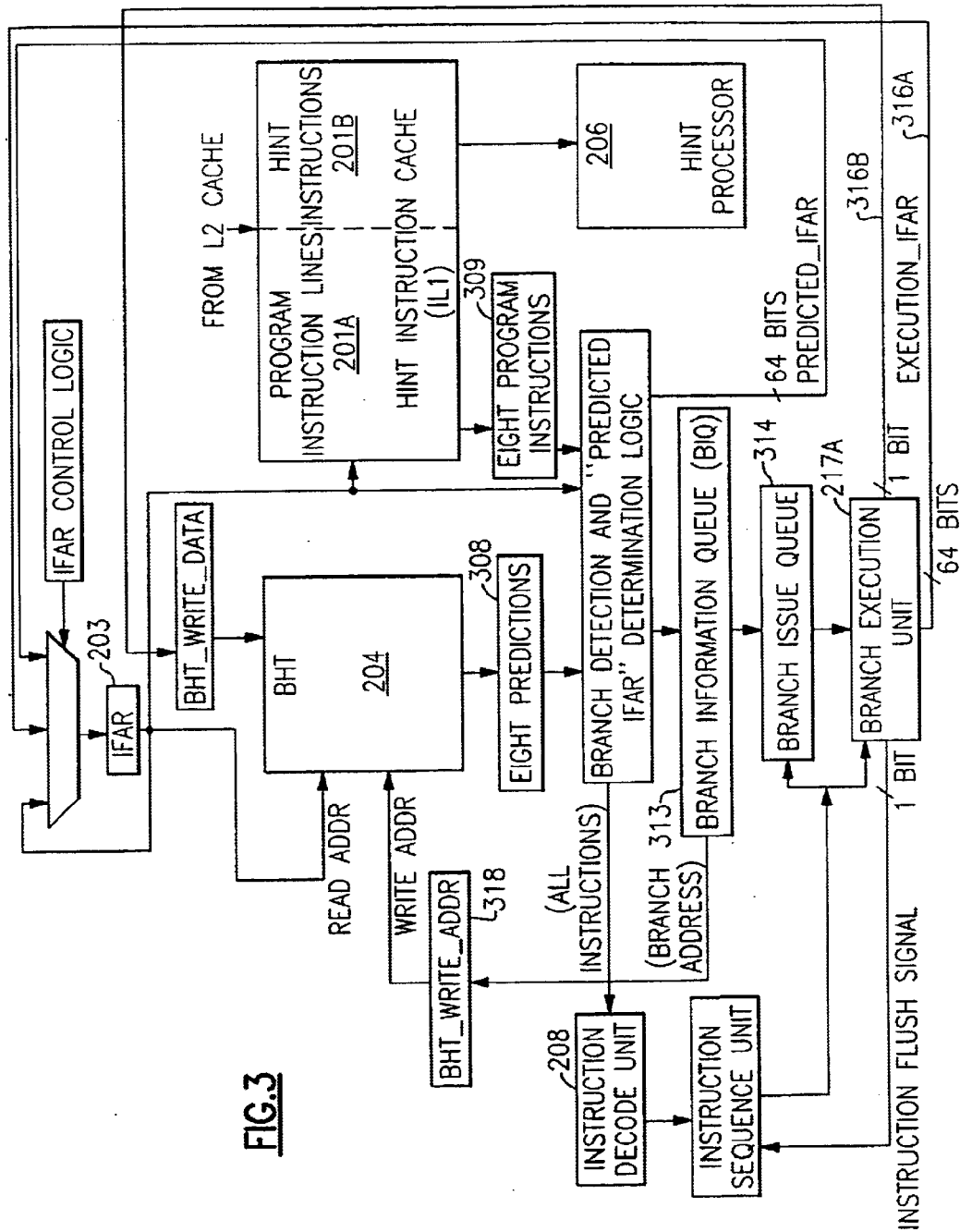
FIG. 3 is a modified view of the hint instruction controls represented in FIG. 2.

The IL1 index bits 48:58 of the IFAR address are also used to select a BHT entry in a BHT 204, shown in FIGS. 2 and 3. Thus, IFAR bits 48:58 associate a BHT entry in BHT 202 with an instruction line and a hint instruction in IL1 201 and its corresponding directory entry in the IL1 directory 202.

IL directory 202 is a conventional and contains a "valid bit" field and a 48 bit "address of the first instruction" (i.e. first instruction address) field. A valid state in the valid bit field indicates that the associated IL1 row (in IL1 201) contains an instruction line, and that the "first instruction address" field locates the first program instruction to be selected for execution in that instruction line. An invalid state of the valid bit indicates the contents of the corresponding IL1 row are invalid and should not be used.

In this embodiment, each IL1 row contains space for eight 32 bit program instructions and one 32 bit hint instruction shown at the end of each row. Hence, each program instruction and each hint instruction has an instruction length of 4 bytes (i.e. 32 bits), in the respective columns 201A and 201B of IL1 201. In the IL1 directory row, each "first instruction address" field contains 48 bits which locate the first program instruction to be accessed in the corresponding row in IL1 201.

The first instruction address" field in the IFAR selected IL1 directory row is used only if the content of the "first instruction address" field in that row matches the current address bits 0:47 in IFAR 203. When a compare-equal occurs between IFAR bits 0:47 and the "first instruction address" field in the accessed IL1 directory row, the addressed first instruction is allowed to be used in the associated IL1 row.

In FIG. 2, the BHT 204 operates with IL1 201 to provide a prediction of whether the branch instructions stored in IL1 201 are to be "taken" or "not taken" in the program being executed. Generally, a "taken" branch instruction indicates the instruction path is to go to the address indicated by that instruction, and a "not taken" branch instruction indicates the instruction path is to continue with next sequential instruction in the program.

Each BHT entry in this embodiment contains eight 1-bit prediction fields. The sequence of the eight 1-bit prediction fields in any BHT row respectively provide a prediction of the "taken" or "not taken" state for each branch instruction at the corresponding position in the line. A BHT bit is ignored when its corresponding program instruction is not a conditional branch instruction. Thus, the only meaningful prediction bit(s) in any BHT row are those that correspond to a conditional branch instruction in the associated IL1 row. The 0 state of a BHT prediction bit indicates it is predicting the "not taken" state for any corresponding conditional branch instruction, and the 1 state of a prediction bit indicate it is predicting the "taken" state for any corresponding conditional branch instruction.

FIG. 3 shows in more detail parts of FIG. 2 and shows it from another perspective to aid in the teaching the operation of the detailed embodiment of this specification. Thus, FIG. 3 shows IL1 201 in more detail as having a section 201A containing program instructions and a section 201B containing hint instructions. That is, each row of instructions in IL1 201 has its leftmost part in section 201A for containing program instructions, and its rightmost part in section 201B for containing a hint instruction at the end of each row. Section 201A operates as an Instruction Cache (I-cache) of the type described in the incorporated U.S. Pat. No. 6,598,152, granted Jul. 22, 2003 for increasing the overall prediction accuracy for multi-cycle branch prediction processes and apparatus for enabling quick recovery in generating new prediction for the BHT.

As previously mentioned, the address in IFAR 203 selects a row of program instructions in IL1 201 and an associated BHT row of prediction fields in BHT 204. FIG. 3 illustrates the IFAR selected BHT row (i.e. also herein called the current BHT entry) being outputted to an "eight prediction" register 308, and the IFAR selected IL1 row (i.e. a group of 8 program instruction fields) being outputted to an "eight program instructions" register 309. Each branch instruction field in register 309 has an associated branch prediction field at a corresponding location in register 308. The associated branch prediction field is only used if the corresponding branch instruction field contains a conditional branch instruction. Hence, the associated branch prediction field is not used if the corresponding instruction field contains a non-branch instruction.

The "branch taken/not taken" state of each branch prediction bit in register 308 (when associated with a corresponding conditional branch instruction in register 309) is generally determined by the most-recent execution of that instruction in the current program. The correctness of this branch prediction Is checked by branch execution logic (209,216,217A) after the IFAR selection of the corresponding branch instruction in the program. Whenever the check by branch execution logic (209,216,217A) finds a BHT prediction is correct, the last predicted execution path continues to be followed in the program without interruption. But when execution logic (209,216,217A) finds a BHT bit prediction is wrong, the wrong path has been followed in the program, the correct path must be found and followed, and the execution results of the wrong path are discarded. Thus, when logic (209,216,217A) finds the currently BHT prediction bit is wrong, the correct setting for that BHT bit also is determined, and the state of that BHT bit is changed to its correct state. The target address of the executed branch instruction is then known and is determinative of the location in the program execution from which the incorrect path began and is the beginning of the correct new execution path in the program.

This manner of operation for re-setting the execution path when a wrong prediction is detected by logic (209,216, 217A) is described and claimed in the incorporated U.S. Pat. No. 6,598,152, granted Jul. 22, 2003. In more detail regarding this incorporated specification, whenever a new row of instructions was fetched into its instruction cache (I-cache) from a storage hierarchy, these newly fetched instructions overlay and replace any and all instructions previously stored in that I-cache row. In this prior system, the BHT entry associated with that I-cache row are not replaced in the BHT when the associated IL1 row received the newly fetched instruction line. Thus, whatever pre-existing prediction states exist in the BHT entry (determined by execution of the replaced instructions in the row no longer in the I-cache) are then used as the branch predictions for the new unrelated branch instruction(s) newly fetched I-cache row and overlaying the corresponding that were used to generate those BHT bit states. When any BHT prediction bit is used and then later found incorrect by execution logic (209,216, 217A), the bit is belatedly rewritten in its BHT location to correct it. The penalty for incorrectness of any BHT bit prediction is the loss of all execution results obtain from instructions executed in the wrong execution path and the time taken for such wrong executions. Hence for each BHT bit correction, many unneeded instructions may have been selected and executed, wasting many instruction selection and execution cycles which detract from the required program execution and decrease the program execution speed.

The rate of incorrect predictions is decreased by this invention enabling recent branch history lost in the prior art operation (when instructions are replaced in an instruction cache) to be retained in hint instructions and reused. The subject invention increases the likelihood of the associated BHT prediction field being correct for a I-cache row of instructions re-fetched into the instruction cache—by enabling the saving and reuse of the prediction fields associated with overlaid rows of instructions in an I-cache whenever that row of instructions is refetched during later execution of a program.

The top of the storage hierarchy in FIG. 2 is herein called "level 1" in the storage hierarchy of the system and contains the instruction cache IL1 201 and a data cache (D-cache) 221. They respectively provide the instructions and data to the central processor for execution by the current program. The next level in this hierarchy is called "level 2" which provides the instruction lines and data to the level 1 caches, and herein is provided by the L2 cache 212 which contains both instructions and data It provides instruction lines to IL1 201 and lines of data to D-cache 221 in response to demands (misses) by the level 1 caches. L2 cache 212 obtains its instructions and data from the main memory of the computer system in the conventional manner of storage hierarchies.

The L2 cache of this invention has the unique structure for containing hint instructions which is not found in the prior art.

In IL1 201 (see FIG. 6) and in the L2 cache with hint extensions (see FIG. 7), the program instructions and the hint instruction are stored in predetermined locations in each of the cache entries to distinguish the program instructions from the hint instruction stored in the same cache entry. Thus the left part of each IL1 and L2 cache row contains space for storing a line of program instruction, and the right part of the row contains space for storing a hint instruction or a NOP instruction. The hint instruction locations in both the IL1 and L2 caches are initialized to contain NOP instructions, which are overlaid whenever a hint instruction is to be stored into the cache entry.

Thus initially during program execution, NOP instructions exist in the hint instruction locations in the IL1 and L2 caches. When an initial miss occurs for a program instruction line in both the IL1 cache entry, and in the L2 cache, the line of program instructions (containing the requested instruction) is fetched from system main storage into that line location in the L2 cache, and also into the IL1 cache entry. Later during the program execution, the space occupied by this IL1 cache entry may be needed for a new line of program instructions which maps to this same IL1 cache entry during execution of the program. Before the new line is allowed to be stored into this IL1 cache entry, the existing line in the IL1 cache entry is replaced in the IL1 cache and a hint instruction is stored into the L2 cache entry having the copy of the replaced instruction line with the hint instruction generated for the BHT entry of the replaced instruction line.

Figure 2A:
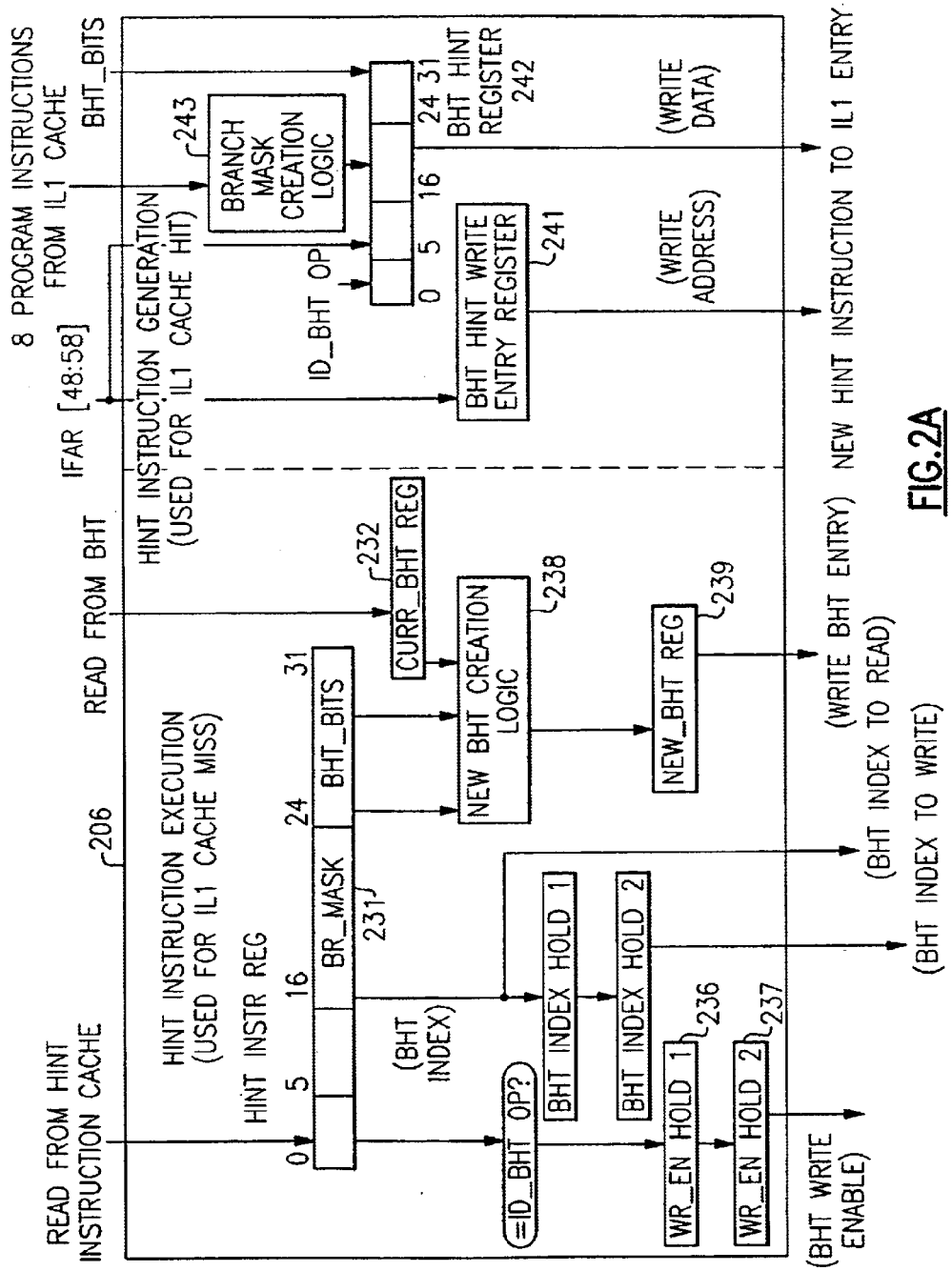
FIG. 2A shows the hint processor represented in FIG. 2.

In FIG. 2A, each hint instruction is generated in the detailed embodiment by "hint instruction generation" circuits in the hint processor when required during the program instruction executions. The detailed embodiment uses "hint instruction execution" circuits in the hint processor to execute each hint instruction when required during the program instruction executions. Alternatively to having separate hint processor hardware circuits, the same hint processor generation and execution functions may be provided by having these functions micro-coded as subprocesses in the central processor executing the program.

The general operation of the ILL cache with concurrent hint instruction suboperations is done in FIGS. 2 and 3 as follows: When the central processor in FIG. 2 needs to select an instruction, the IL1 cache row is selected by IFAR bits 48:58 (i.e. the current instruction address is in IFAR). If that row contains the IFAR addressed instruction, it is accessed to provide an IL1 hit. If that instruction is not found therein, an IL1 miss occurs.

An IL1 cache miss may occur under two different conditions: (1) The valid bit in the associated IL1 directory entry may be Indicating the invalid state, which will cause a cache miss. (2) When that valid bit is indicating a valid state, a cache miss occurs if the current IFAR address bits 0–47 do not match the current address in the "address of the first instruction" field in the associated IL1 directory entry.

If an IL1 cache miss occurs for reason (1), i.e. because the directory valid bit indicates the invalid state, no valid instruction line exists in this IL1 cache entry and a new Instruction line may immediately be fetched from the L2 cache and copied into that IL1 cache row. The hint instruction associated with the L2 cache copy of the line is copied into the hint instruction location in the same IL1 row. The form of the copied hint instruction is the form found in the copied L2 cache row, which is either 100 or 109 in FIG. 1.

However, if an IL1 cache miss occurs because of reason (2), i.e. the directory valid bit indicates the valid state when the IL1 directory entry's "address of the first instruction" field does not match the current IFAR address bits 047, a valid instruction line exists in the IL1 cache row with an associated hint instruction, and the hint instruction must be castout to the L2 cache row containing a copy of the IL1 instruction line before it is overlaid by a hint instruction associated with the instruction line being fetched. This L2 cache row is located by using the "address of the first instruction" field in the associated IL1 directory entry.

It will be recalled that current programs are comprised of read-only code which is not changed during execution of a program. Therefore the read-only program instructions in an existing line in IL1 201 do not need any castout operation (as is required for data changed by the program instructions in D-cache 221). Therefore, no castout is required for an IL1 line of program instructions about to be overlaid, since the line can be later obtained from a corresponding line in some level of the system storage hierarchy. A line of program instructions in an IL1 cache entry usually has a copy in a corresponding L2 cache entry, and the corresponding L2 cache entry may have copies at other levels of the storage hierarchy.

Hint instructions are generated and written into the IL1 and L2 cache rows by the hint instruction generation process when an instruction hit occurs in IL1. A hint instruction 100 is generated and written into the hint instruction location in an associated IL1 row by the hint processor 206. This hint instruction generation process uses the current IFAR address and the associated line of program instructions to generate the fields in each hint instruction.

When a valid instruction line exists in the IL1 row having a miss, its associated hint instruction is executed by the hint processor 206 concurrent with its castout to its L2 cache row and while the newly fetched line of instructions is being written in the IL1 cache entry to overlay the associated line. The newly fetched hint instruction (from the IFAR addressed L2 cache row) is written into the hint instruction location, overlaying the executed hint instruction in that location.

It is to be noted that on any IL1 cache miss, the replacement new line of instructions is obtained from a different L2 cache entry than the L2 cache entry containing a copy of the replaced IL1 cache line causing the miss. It is further to be noted that branch instruction distribution in the replacement line may be independent of the branch instruction distribution in the replaced line. This has implications in the content of their BHT prediction values by indicating that each has a BHT content independent of the other.

The L2 cache is generally much larger than the IL1 cache and has many time more entries than the IL1 cache. The L2/IL1 entry ratio is preferably a power of two. In the described embodiment a ratio of 32 (32=2**5) is used. A small L2 cache may have twice the number of entries of the IL1 cache. An expected common occurrence during the IL1 cache misses for many IL1 cache entries is to have a replacement sequence for an IL1 cache entry which alternates between two different L2 cache instruction lines, which are respectively associated with two different hint instructions. These two instruction lines may have one or more branch instructions at different locations, and/or one or more branch instructions at the same location within their respective lines. This different branch instruction distribution characteristic can affect their respective BHT values during the operation of this invention.

A hint instruction stored in the L2 cache enables the current program to refetch the associated line from the L2 cache and restore the associated BHT prediction bits to the most recent prediction state(s) for any branch instructions in the line without disturbing the prediction states for any non-branch bit positions in the BHT entry. The implication of this is that the undisturbed states of the non-branch positions may continue to represent the latest predictions for any branch instruction(s) in an alternate instruction line when It is not stored in the IL1 row to which it maps. These BHT bit predictions for the non-branch positions have the advantage of not needing to be regenerated when the alternate line for which they were generated is later refetched into that IL1 row; whereby if their states were disturbed it would Increase the chance of selecting one or more wrong execution paths when the alternate line is again written in that IL1 cache row.

In this manner, the BHT prediction bit states for branch mask positions in the hint instructions stored in the L2 cache provide "hints" of the most recently used "taken/non-taken" branch state of each conditional branch instruction in their associated lines of instructions, whereby the mask indicated positions have a greater than 90% chance of providing correct predictions, instead of merely the 50% chance of providing a correct prediction if they were represented by the BHT values for the last instruction line in that IL1 cache entry.

In this manner, the hint instructions can restore the BHT bits for the branches in refetched IL1 lines to the prediction states most likely to correctly predict the branch outcomes. Thus the result of using the hint instructions of this application is to save processor execution time that would otherwise be lost in executing unnecessary instructions in wrongly selected execution paths in a program due to using incorrect BHT bit states for replaced IL1 lines.

Figure 7:
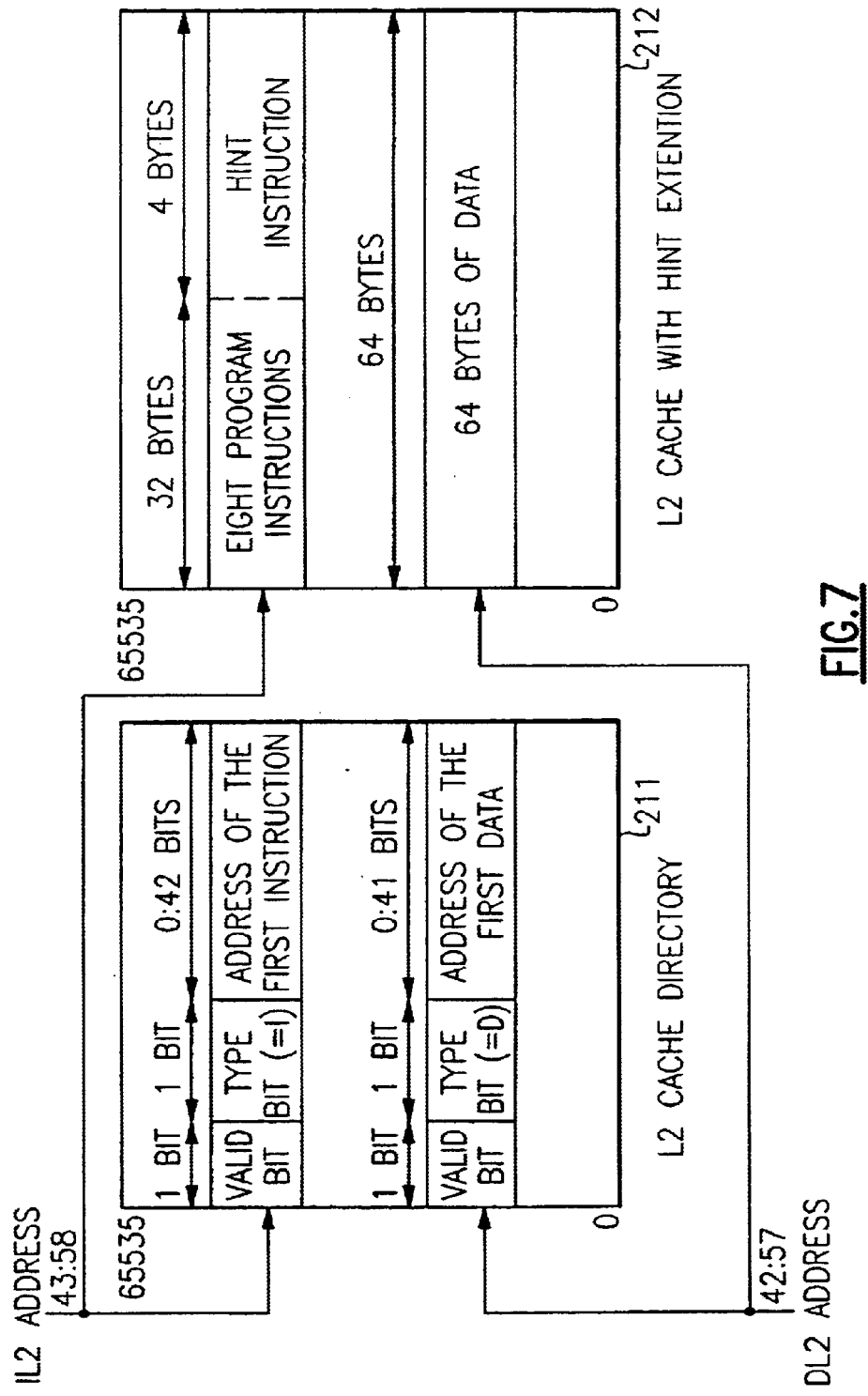
FIG. 7 shows the general form of a L2 Cache Directory and its novel associated L2 Cache shown in block diagram form in FIG. 2.

FIG. 7 shows the form of the L2 cache 212 and its directory 211 in the described embodiment. IFAR address bits 43 through 58 (43:58) are used as an index to locate and to associated a L2 cache entry and its corresponding L2 directory entry. Each L2 directory entry contains a "type bit" for indicating whether the addressed cache row contains an instruction line (I) or a data line (D). For example, type "1" may indicate a line of instructions, and type "0" may indicate a line of data words. Each L2 directory entry also contains the "address of the first instruction" in its associated line and a valid bit to indicate if the addressed line is valid.

The IL1 cache and the L2 cache used in the detailed flow diagrams in FIGS. 8–13 are shown in FIGS. 6 and 7, in which the IL1 cache is a dedicated instruction cache which only contains instructions, which in this specification can have two types of instructions stored therein: "program instructions" and novel "hint instructions". There also is a IL1 data cache 221 which contains the data accessed by the operands in the instructions executed from the IL1 instruction cache. This invention may also use a unified IL1 cache not shown) containing both instructions and data.

In the detailed embodiment, a unified L2 cache is shown and used; it is a unified cache because it contains both instructions and data. Data cache operations are not used and are not needed in explaining this invention being claimed in this specification. In the corresponding L2 directory entry an "I" or "D" indication in a predetermined field indicates whether the associated line contains instructions or data, when the valid bit is set to the valid state in that L2 directory entry.

Each L1 and L2 cache row has space for a line of instructions and space for an associated hint instruction; the hint instruction space is in a predetermined location in each row, which may be anywhere in its row but is shown herein at the end of its line of instructions.

Other tag bits (not shown) may also be included in each directory entry, for example, an L2 directory entry containing a "D" indicator may also contain a "change bit" (not shown) to indicate if the data in the corresponding L2 cache entry has been changed since it was received by that L2 cache entry, whereby a castout of the contained data line need only be done if the data is indicated as having been changed. An "I" indication in a L2 directory entry does not need any "change bit" because the program instructions are not changeable in any cache entry.

Program instructions and data are fetched from the system storage hierarchy to the L2 cache entries in response to an L2 cache miss. Program instructions are fetched from L2 cache entries to IL1 cache entries in response to an IL1 cache miss.

However, only changed data in the L2 cache is castout to the system storage hierarchy when the data is to be replaced in an L2 cache entry. No castout is done for program instructions, because all program instructions are presumed to be read only and unchangeable in both the IL1 and L2 caches.

A line of program instructions may remain valid in the L2 cache entry as long as its L2 cache space is not needed for other program instructions. The mask-located prediction bits in any BHT field in the L2 hint instruction remain usable as long as its associated line of program instructions is valid in the L2 cache. A BHT entry may later be restored by a hint instruction when the associated line of program instructions is later retrieved from a valid L2 cache entry having a hint instruction. The restored BHT prediction bits in a BHT entry have the prediction values existing when their hint instruction was generated at the time of the last hit in the line in a IL1 cache entry. The restored prediction states of the BHT bits provide "hints" as to the most likely taken, or not-taken, path from a branch instruction in the line of program instructions.

FIG. 2A shows a detailed embodiment of hint processor hardware logic sub-circuits which are preferably located in the same semiconductor chip having the circuits used for processing the program instructions using the hint instructions. The hint processor is shown in two parts: a "hint instruction generation" part on the right of the vertical dashed line, and a "hint instruction execution" part on the left of the vertical dashed line.

In the hint processor in FIG. 2A, the "hint instruction generation" circuits have a BHT hint write register 241 into which are loaded IFAR address bits 48:58. These address bits are also received in the eleven-bit "bht index" field having locations 5–15 in a BHT hint register 242. The hint instruction operation code is internally provided into its first four bit locations 0–4 comprising the "Ld_bht_op" field. Concurrently, all program instructions (up to 8 instructions comprising the instruction line in the selected IL1 cache entry) are copied to "branch mask creation logic" register 243, from which a "branch mask" field is formed in register 242. To form the mask, a "1" bit is stored in the branch mask field to locate each branch instruction in the line, and a "0" bit is stored in the branch mask field to locate each non-branch instruction in this field. Thus, in the branch mask field each bit positions in the mask corresponds to the position of its represented program instruction in the line.

The "bht_bits" field at bit positions 24–31 in register 242 receives the bits in the BHT field located by the current IF-AR address bits 48:58.

Figure 9B:
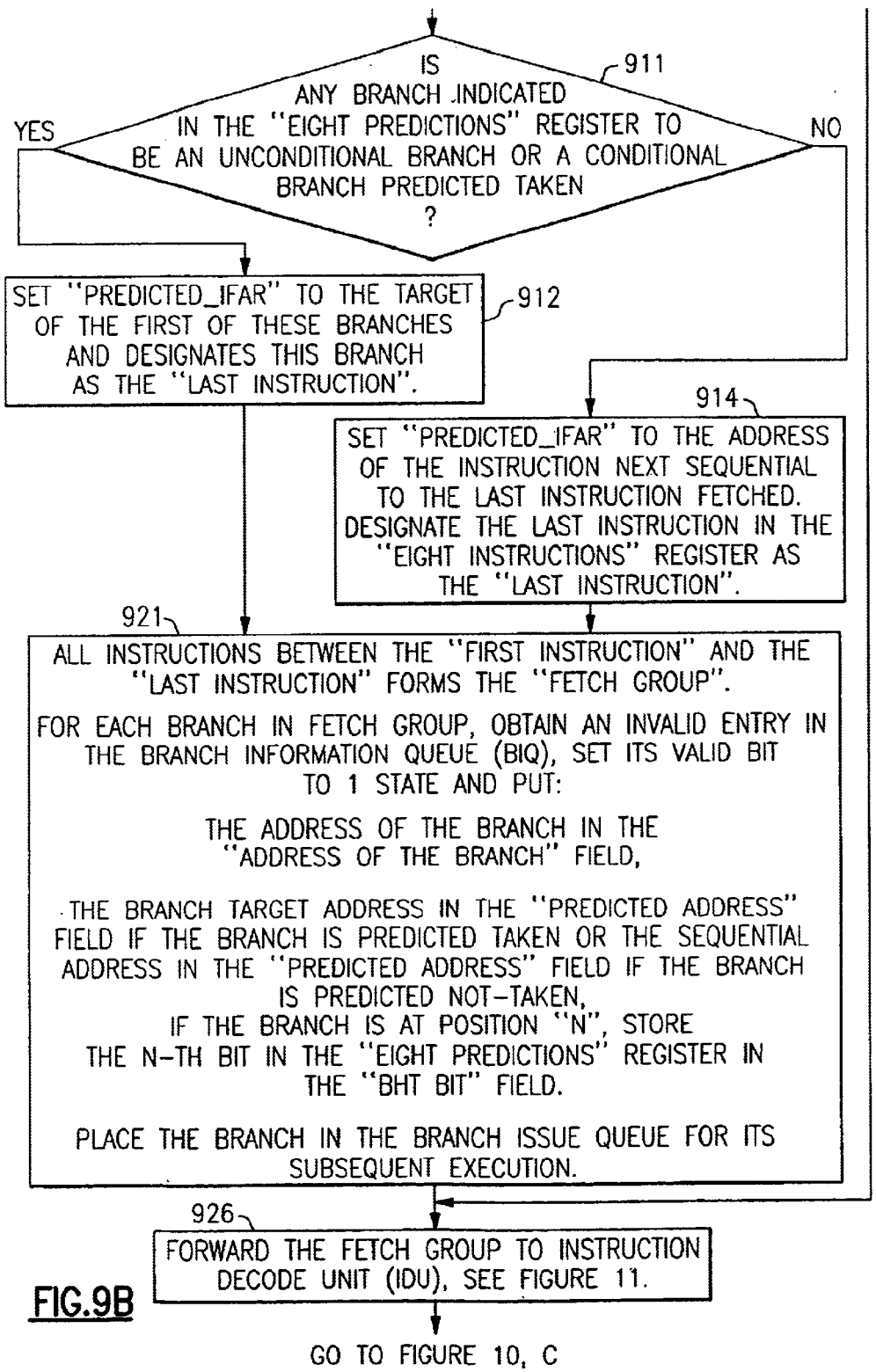

The content of register 242 is outputted to a hint instruction location in the IL1 cache entry located by IFAR bits 48:58 in register 241 when a new hint instruction is required by operation 907 in the process of FIG. 9.

Figure 8B:
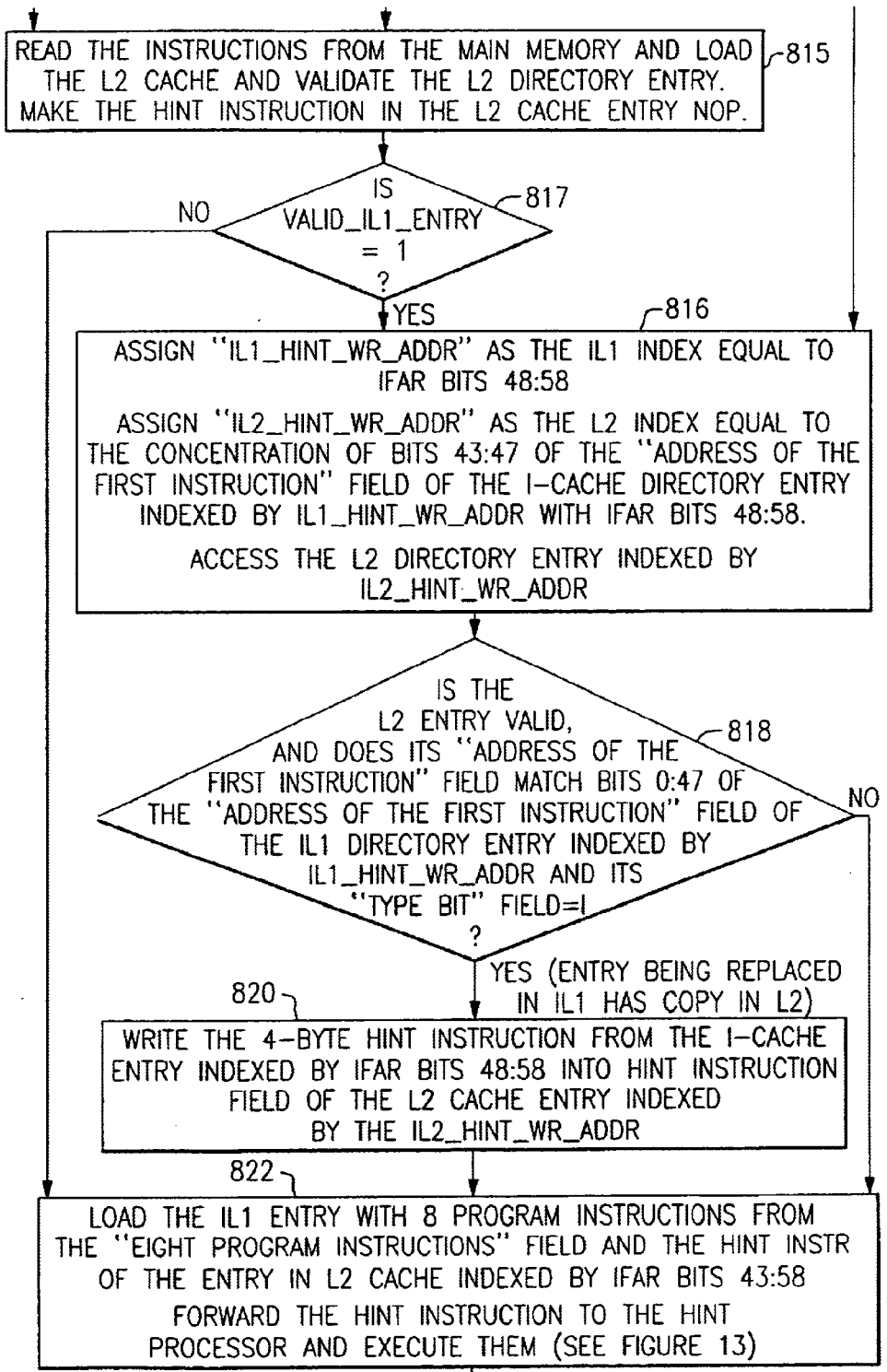
FIGS. 8, 9 and 10 are flow diagrams that include hint instruction processes according to the subject invention which operate during the execution of program instructions for extending branch-history predictive operations in a branch history table (BHT).

The "hint instruction execution" circuits of the hint processor in FIG. 2A are used by the operation 822 in the process shown in FIG. 8. This operation restores the bits in the current BHT entry for the branch instructions in a newly refetched line of instructions. Then, the hint instruction is fetched from the L2 cache to the IL1 cache and is executed by the "hint instruction execution" circuits of the hint processor in FIG. 2A. The execution begins when the hint instruction is transferred into hint instruction register 231 in the hint processor in FIG. 2A. Concurrently, the associated BHT entry (eight bits located by the current IFAR bits 48:58) is copied to the "curr_bht register 232. The "branch mask" field in bits 16–23, and the "bht-bits" field in register 231 are outputted to "new BHT creation logic" circuits 238, which outputs its created BHT value to a "new_bht" register 239, from which it is written in the BHT field located by IFAR bits 48:58 to overlay the current BHT entry in the BHT. Generally, the resultant BHT is a modification of the BHT received by the "curr_bht register 232.

FIG. 2B shows the circuit logic for bit position, n, within the "new BHT creation logic" circuits 238. Bit position n is duplicated for each of the eight BHT bit positions, 0 through 7 comprising each BHT. Only one of the n bit positions may be changed at a time, and it is the bit position that is selected by the current IFAR address. The circuits for BHT bit n comprise two logical AND gates 251 and 252 having their outputs connected to an OR circuit 254, which provides the "new_bit (n)" output that is written into the BHT at the current IFAR selected I-index. Thus, gate 251 receives the "bht_bits(n)" bit in the "bht_bits" field. Gate 252 receives "curr_bht(n)" bit in the "curr_bht" field. Gate 251 is enabled by bit n in the "branch mask" field, called "branch_mask(n)". Gates 251 and 252 are alternately controlled by bit n in the "branch mask" field, wherein "branch_mask(n)" enables gate 251 and its inverted value outputted by inverter 253 disable gate 252 when gate 251 is enabled, and visa-versa. The eight bit content in the "new_bht" register 239 provides the output value written into the currently addressed BHT entry.

Having a L2 cache support two or more L2 lines simultaneously having copies in the IL1 cache requires the L2 cache size to be at least twice as large as the IL1 cache. The L2/IL1 ratio is the ratio of the number-of-L2-cache entries to the number-of-IL1 cache entries. In detailed embodiment, the L2/IL1 ratio is a power-of-two-ratio. When this ratio is two or more, it enables the L2 cache to simultaneously contain a copy of a current IL1 line, and a copy of a IL1 replacement line for the same IL1 cache entry. It is advantageous to make the L2 cache have several times the number of IL1 cache entries, in order to reduce the L2 cache line thrashing caused by L2 cache misses which can delay the IL1 cache operations, when new lines of program instructions must be obtained from the system storage hierarchy. Thus at a minimum, the L2 cache should have at least twice the number of entries in the IL1 cache for a minimum ratio of two.

In the detailed embodiment, a L2/IL1 ratio of 32 (32= 25) is used, which allows up to 32 different L2 entries to map to each IL1 entry in the illustrated IL1 cache, which has 2048 IL1 cache entries (211=2048). These 11 bits are represented by bit positions 48:58 in any 64 bit address, and these bits 48:58 map into the IL1 cache the program address for a line of instructions, and the remaining high-order bits 0:47 of the 64 bit address are placed in the IL1 cache directory to identify the 64 bit address. To map any memory address into the IL1 cache, the 11 bits 48:58 in the 64 bit address are used as an index into the IL1 cache to select the IL1 cache entry. The remaining high-order bits 0:47 of the 64 bit address are placed in the IL1 cache directory to identify the 64 bit address in the IL1 cache directory entry at the same index (i.e. bits 48:58) as is used to locate the IL1 cache entry.

The L2 cache in the detailed embodiment has 65385 L2 cache entries (65386=216), whereby 6538612048=32 (which is the L2/IL1 size ratio). To map any 64 bit memory address into the L2 cache, its 16 bits 43:58 are used as an index into the L2 cache to select the L2 cache entry. The remaining high-order bits 0:42 of the 64 bit address are placed in the corresponding L2 cache directory entry located therein at the same index (i.e. bits 43:58) as is used to locate the associated L2 cache entry to identify the same 64 bit address in that L2 cache directory entry. Thus, any 64 bit address may be mapped into the L2 cache at L2 index 43:58 having its high-order bits 0–42 placed in the corresponding L2 cache directory entry at this same index 43:58; and this same 64 bit address may be mapped into the IL1 cache at IL1 index 48:58 having its high-order bits 0–47 placed in the corresponding IL1 cache directory entry at this same index 48:58**.

Using these IL1 and L2 cache sizes, the memory address of the current IL1 line (to be replaced) is identified by IFAR bits 0–47 in the current IL1 directory entry located in the IL1 cache at the IL1 index determined by bits 48:58 of the IFAR address. The current IL1 line (being replaced in IL1) has a copy in a L2 cache entry located in the L2 cache located by the address identified in an "address of the first instruction" field in this IL1 directory entry. The replacing line in the L2 cache has its copy is located at IFAR index 43:58 and its L2 directory entry contains bits 0:42 of this same memory address. A hint instruction is executed during the IL1 line replacement process, as the hint instruction is fetched from the L2 cache row, to modify the BHT to provide the best available BHT predictions for the branch instructions in the newly fetched line. A new hint instruction is generated each time an instruction hit is obtained in the line to refresh the hint instruction stored in the IL1 row to insure it has the latest predictions provided in the BHT for the branch instructions in the line.

The hint instructions enable a program to most efficiently perform its instruction executions. The avoidance of mispredictions by this invention avoids aborting execution selections in the processor's instruction execution pipeline where the branch instruction executions are belated checked and found to be incorrect due to executing mispredicted branch instructions. Mispredictions cause much additional program delay due to additional instruction executions caused by backtracking the execution stream to correct mispredicted execution paths, requiring additional fetches of lines of instructions from the IL1 cache in a program that significantly slow the execution of the program. This invention can avoid most of the mispredicted target instruction delays, speeding up the execution of any program.

Detailed Description of Processes and Subprocesses Used by the detailed Embodiment:

The process in FIG. 8 is entered at operation 802 when program execution is started in the processor. Then operation 804 sets the processor's IFAR (instruction fetch address register) to the address of the first instruction in the program and start execution of the program. The processing performed in FIG. 8 is concerned with hint instruction generation and use during a processor's selection and execution of program instructions in an IL1 instruction cache 201 utilizing BHT branch predictions, and using an L2 cache 212 storing hint instructions during the execution of the program.

The next operation 806 uses the current IFAR address bit positions 48:58 as an IL1 index to locate a line of instructions in an entry in the IL1 directory 202. It is to be noted that operation 806 may be enter on the initiation of a program, and is reentered in response to an IL1 cache miss which causes operation 806 to be reentered on a loop back from the last operation 822 in FIG. 8.

The next operation 807 tests the validity bit in the located IL1 directory entry. The state of the valid bit is written into a processor storage field called "valid_IL1_entry" which is set to a "0" state by operation 808 when the no path is taken from the operation 807 test when it indicates the IL1 directory entry is in the "invalid" state.

If operation 807 finds it valid, the yes path to operation 809 is taken and the "valid_IL1_entry" is set to the "1" state, which indicates a valid line exists in the current IL1 entry. Then operation 809 determines if the current IFAR address has a hit or miss with this valid line, and the "address of the first instruction" field is read from the IL1 directory entry to determine the main memory address of the IL1 entry to be overlaid. The "address of the first instruction" field contains the high-order bits 0:47 of the memory address for locating the corresponding (associated) instruction in the IL1 cache 201 entry located by the current IFAR address bit positions 48:58. The first (or next) instruction to be executed in the program in this IL1 entry is located by bits 59 through 61 (i.e. 59:61) of the current IFAR address (used as an index in the current line of program instructions in the currently accessed IL1 cache entry).

An IL1 cache hit (IL1 hit) is obtained when operation 807 finds the valid bit in the valid state, and the yes path is take from operation 809 when the "address of the first instruction" field compare equal with the current IFAR bits 0:47, causing the process to go to FIG. 9 entry B which enters operation 901 as the next operation in the process. But if operation 809 finds an unequal compare, the no path is taken to operation 810.

When operation 807 finds the valid bit in the invalid state, and operation 808 sets the "valid_IL1_entry" field to 0, operation 810 is entered. Operation 810 accesses the L2 cache directory entry located by an L2 index determined by the current IFAR bits 43:58.

Then, operation 812 is entered. Operation 812 tests the L2 cache entry for an L2 cache hit/miss indicated by an valid/invalid bit state in the L2 cache directory entry. If invalid, the L2 cache directory does not contain a copy of the required line of program instructions for the IL1 with an accompanying hint instruction, and operation 815 is entered.

But if operation 812 finds a valid L2 entry, the yes path is taken to operation 813 to determine if the valid L2 entry has a L2 hit or L2 miss. An L2 miss is determined if operation 813 finds the address of the first instruction in the L2 cache directory entry mis-matches with the current IFAR bits 042. Then, the no path is taken to operation 814, which checks the state of the type bit in the same L2 directory entry. An L2 cache miss is then determined if-operation 814 finds the D (data) type is indicated for the addressed L2 cache entry, since an I (instruction) type is required for the addressed L2 cache entry if a cache hit occurs, which would allow the instructions in that line to be fetched to the IL1. However, the D type indication (L2 cache miss) requires that operation 815 be entered to use the IFAR address to fetch a line of instructions in the system main memory and store that line into the currently addressed L2 cache entry, and the corresponding L2 directory entry is validated by setting its type bit to the I state and its valid bit to the valid state.

Operation 815 also sets a NOP hint instruction 109 into the hint instruction field of the addressed L2 cache entry for the new L2 instruction line, which will be fetched into the IL1 as a new IL1 instruction line. Then, operation 817 checks the valid state of the IL1 directory entry (valid if the "valid_μl_entry" field equals 1) to determine if the corresponding IL1 entry contains a valid IL1 cache line which is about to be replaced in the IL1 entry.

When operation 817 finds the "valid IL1_entry" set to the "0" (indicating a invalid state for the IL1 entry), there is no IL1 line to be overlaid. Therefore the IL1 entry is in a condition to receive the new replacing instruction line from the L2 cache, since there is no current IL1 entry to replace, and the no path is taken to operation 822.

Then, operation 822 accesses the L2 cache row addressed by IFAR bits 43:58 and transfers it to the currently accessed IL1 entry; that row contains an instruction line having "eight program instructions", and a hint instruction. This hint instruction is also forwarded to hint instruction register 231 in the hint instruction processor 206 shown in detail in FIG. 2A, which then executes the hint instruction newly written into the accessed IL1 entry from the L2 cache entry. Also, the current BHT entry is replaced with a modified BHT entry generated in the hint processor 206, as explained herein for FIGS. 2A, 2B and 13.

However, if operation 817 finds the "valid IL1_entry" set to the "1" (indicating a valid IL1 entry will be replaced which does not match the current IFAR bits), the process then follows its yes path to operation 816 which assigns a "IL1_hint_wr_addr" field in a predetermined storage location and stores in it the IL1 cache index of the hint instruction which is provided by current IFAR bits 48:58. Operation 817 also assigns a "IL2_hint_wr_addr" field in another predetermined storage location to the copy of the line about to be replaced in the IL1 cache, and stores its L2 cache index, which is the concatenation of bits 43:47 in the "address of the first instruction" field of the IL1 directory entry located by IFAR bits 48:58 (now-stored in the "IL1_hint_wr_addr" field). Then operation 816 accesses the L2 directory entry at the address stored in the "IL2_hint_wr_addr" field, and goes to operation 818.

For finding the L2 line address of the line to be fetched, operation 816 determines the L2 address for the current line in IL1 by assigning a "IL1_hint_wr_addr" field in a predetermined storage location to receive the current entry's IL1 index, which is set to IFAR bits 48:58.

For locating the L2 copy of the current IL1 entry about to be replaced (which locates where the castout hint instruction is to be stored in the L2 cache), operation 816 assigns an "IL2_hint_wr_addr" field in another predetermined storage location, and this field receives an L2 cache index equal to the concatenation of bits 43:47 of the "Address of the first instruction" field of the IL1 directory entry located by IFAR bits 48:58 in the "IL1_hint_wr_addr" field. Then operation 816 accesses the L2 directory entry at the address indicated in the "IL2_hint_wr_addr" field, and goes to operation 818.

Operation 818 tests if this L2 entry is valid and if it contains a copy of the required IL1 line by comparing the "address of the first instruction" field in the L2 directory and the "address of the first instruction" field in the current IL1 directory entry. Furthermore, operation 818 also checks the "type" field in this L2 directory entry for the "I" state. If all of these tests by operation 818 are successful, the instruction line being replaced in IL1 has a copy in the L2 cache, and the process takes the yes path to operation 820. Operation 820 writes the hint instruction from the current entry in the IL1 cache (indexed in IL1 by the current IFAR bits 48:58) to the hint instruction field of the L2 cache entry (in the row located in the L2 cache by the current content of the IL2_hint_wr_addr field).

However, if operation 818 is unsuccessful, their is no valid instruction line to be replaced in IL1 and it cannot have a copy in the L2 cache, and the process goes to operation 822. Operation 822 loads the currently addressed IL1 row from the currently accessed L2 cache entry transferring the "eight program instructions" field and the hint instruction field from the L2 cache entry located by IFAR bits 43:58. This hint instruction is also forwarded to the hint instruction processor in FIG. 2A, which then executes the hint instruction process shown in FIG. 13, and the FIG. 13 process operates in parallel with a continuation of the process in FIG. 8.

Figure 13:
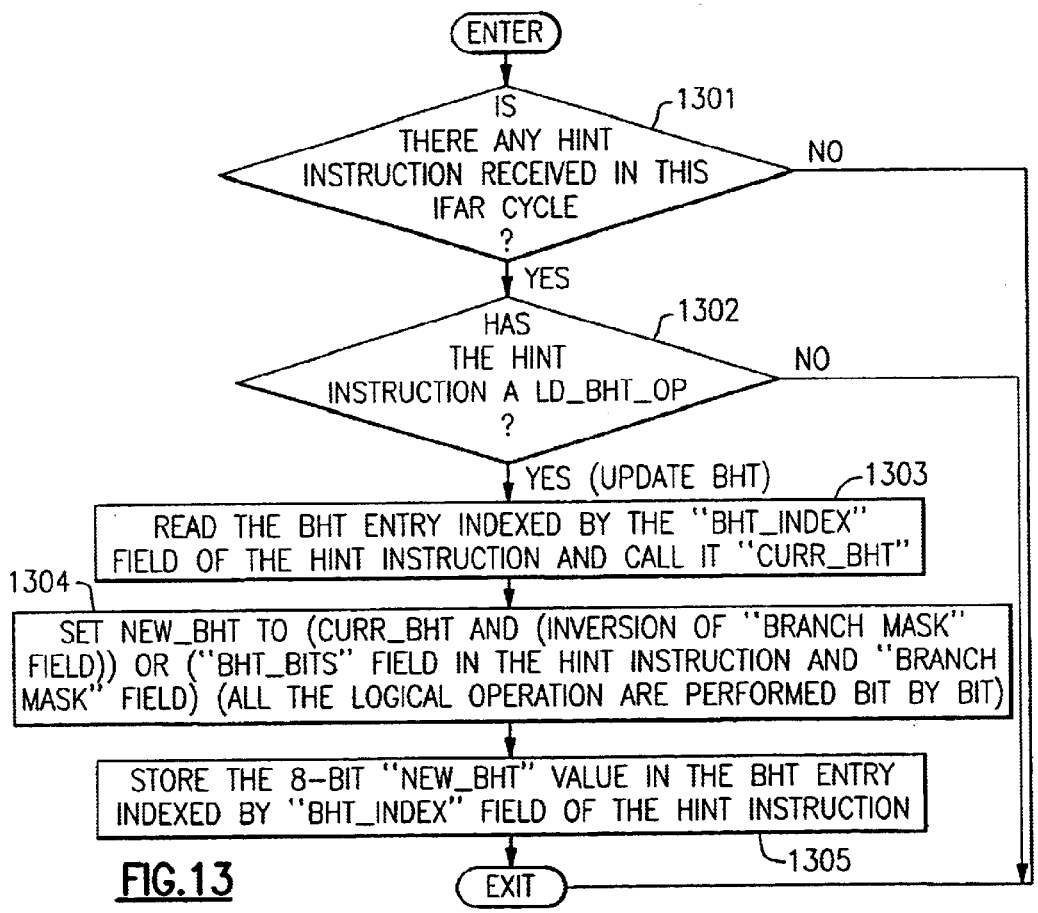
FIG. 13 shows a flow diagram of the subprocess performed by the hint processor shown in FIG. 2A.

The process in FIG. 13 is entered at operation 1301 for testing during the current IFAR cycle if the received instruction is a hint instruction. If the test does not find a hint instruction, the process takes the no path to its exit. If a hint instruction is found by operation 1301, the process goes to operation 1302 to test if the hint instruction operation code is the Id_bht_op field, or a NOP field. If a NOP is found, the process goes from operation 1301 to the exit in FIG. 13. If a ld_bht_op field is found by operation 1302, the BHT write update path is followed (it uses the triggers "wr_en hold 1" 236 and "wr_en hold 2" 237 in FIG. 2A) to send an a hint instruction interpretation enable signal.

Then the next operation 1303 is performed, and it reads the BHT entry indexed by the bht_index field in the current hint instruction, and copies it into the curr_bht register 232.

Then, operation 1304 (using the hint instruction in register 231) generates a new BHT entry for being set in a "new_bht" register. It uses logical AND/OR bit by bit functions as previously explained herein for FIG. 2B, in which each of the respective bit n is generated for the "new_bbt" register as: (the nth curr_bht bit AND the inversion of the nth "branch_mask" bit) OR (the nth bht_bits bit AND the nth "branch_mask" field in the hint instruction).

Finally, operation 1305 stores the eight bit "new_bht" field value in the BHT entry currently indexed by the content of the "bht_index" field of the hint instruction. The process in FIG. 13 then exits and goes to FIG. 8 operation 806 to again read the IL1 directory entry indexed by IFAR bits 48:58. Then operation 807 again tests this same IL1 directory entry for validity; and since it has been made valid, the next operation 809 sets the "valid_IL1_entry" to 1, and finds that now the current IFAR bits 0:47 matches the "address of the first instruction" field in the new content in the same IL1 directory entry. An IL1 hit then occurs and the process goes to FIG. 9 entry point B.

Operation 901 is entered in FIG. 9 at entry point B. At operation 901, the IL1 cache line is fetched into the "Eight Program Instructions" register 309, and the associated hint instruction into the "Hint Instructions" register 231. Next, the BHT entry indexed by the IFAR bits 48:58 is accessed, and its BHT prediction bits are fetched into the "Eight Predictions" register 308.

Then operation 903 uses the IFAR bits 59:61 to locate a "first instruction" in the "Eight Program Instructions" register 309 (Instructions before the "first instruction", if any, will be ignored).

The next operation 904 is tests if there is any branch instruction in the "Eight Program Instructions" register 309 at or after the "first instruction"? If "no", operation 906 is entered and designates a "fetch group" as the instructions from the "first instruction" to the end of register 309. Then, a "Predicted_IFAR" field in logic 311 is set to the address of the next sequential instruction after the "fetch group", and the process goes to operation 926.

But if operation 904 takes its "yes" path, the process performs operation 907, which generates a new hint instruction in the currently selected IL1 cache row. This is done by the hint processor 206 (in FIG. 2A) filling its BHT Hint register 242 with the following: bits 0:4 with "Id_bht_op", bits 5:15 with IFAR bits 48:58, bits 16:23 with an 8-bit "branch mask" field containing a 1 in the positions where there is a branch and 0 in other positions, bits 24:31 with the 8-bit BHT prediction. Then the hint processor stores IFAR bits 48:58 in the BHT Hint Write Entry register 241, and operation 907 finally stores the content of the BHT Hint register in the IL1 Hint Instruction Cache entry indexed by BHT Hint Write Entry register 241.

Then the next operation 911 determines if any branch bit in the "Eight Predictions" register 308 (which in FIG. 3 receives the last-outputted BHT field) indicates an unconditional branch predicted taken, or a conditional branch predicted taken? If the "yes" path is determined, operation 912 is entered and logic 311 in FIG. 3 sets "Predicted_IFAR" address to the target of the first of these branches and designates this branch as the "last instruction", and operation 921 is entered.

But if the "no" path is determined by operation 911, then operation 914 is entered and logic 311 in FIG. 3 sets "Predicted_IFAR" address to the instruction next sequential to the last instruction fetched: and the last Instruction in the Eight Instructions" register 309 is designated as the "last instruction", and operation 921 is entered.

Figure 4:
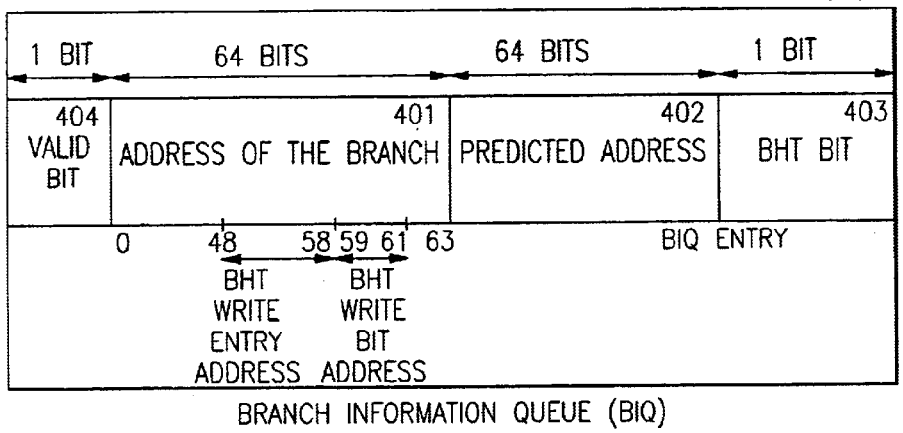
FIG. 4 represents the branch information queue (BIQ), and the form of its queue entries shown in block form in FIG. 3.
Figure 5:
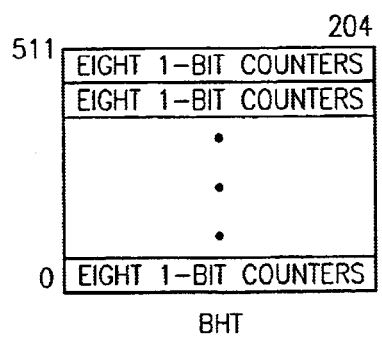
FIG. 5 represents a branch history table (BHT) associated with the Hint Instruction Cache IL1 seen in the block diagram of FIG. 2.

Operation 921 then forms the "fetch group" to contain all instructions between the "first instruction" and the "last instruction" determined in the Eight Program Instructions register 309. For each branch instruction in the "fetch group", operation 926 obtains an invalid entry in the Branch Information Queue (BIQ) 313 in FIG. 3, and FIG. 4 shows BIQ 313 in more detail. Then in BIQ 313, operation 921 sets the valid bit to I state in this BIQ entry, loads the address of the branch into an "Address of the branch" field 401, loads the branch target address In the "Predicted address" field 402 if the branch is predicted taken or loads the next sequential address in the "Predicted address" field 402 if the branch is predicted not-taken, and stores the n-th bit in the "Eight Predictions" register 308 in a "BHT bit" field 403 if the branch is at position "n" in the fetch group. Finally, operation 921 places the branch instruction in Branch Issue Queue 314 for its subsequent execution. Then the process goes to operation 926.

Figure 10A:
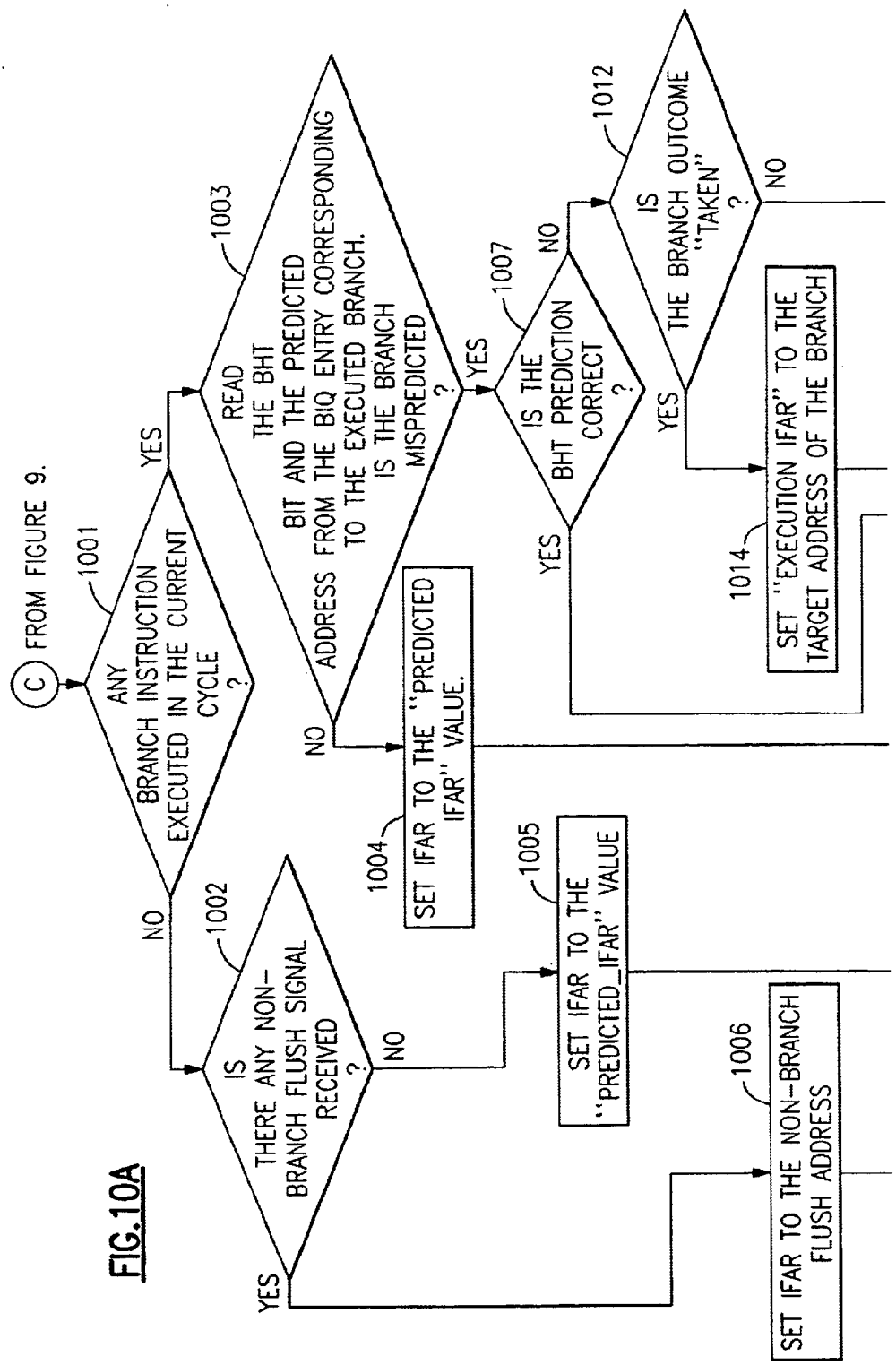
Figure 11:
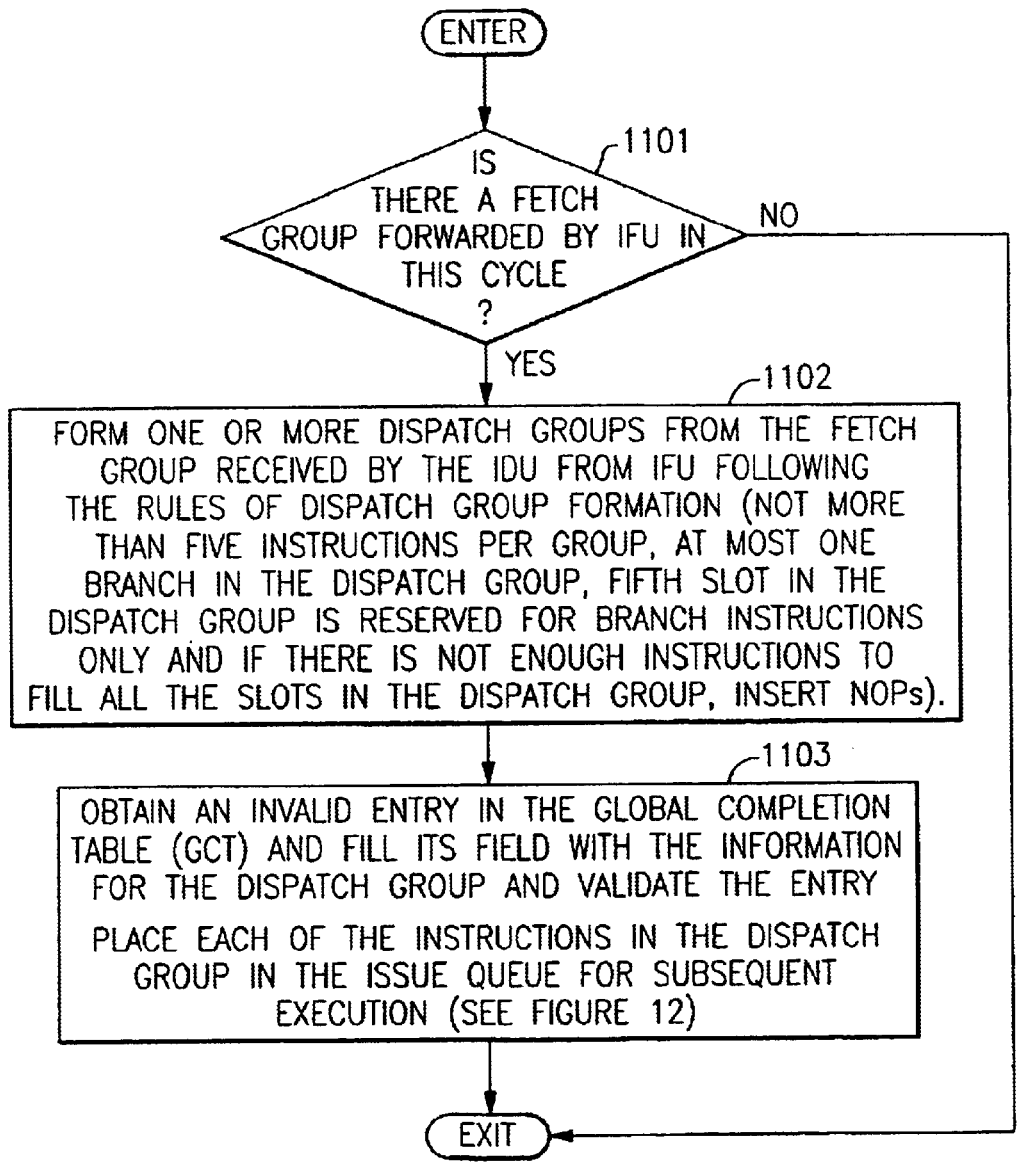
FIG. 11 shows a flow diagram of an Instruction Decode and Dispatch subprocess used in FIG. 9.

Operation 926 forwards the "fetch group" to Instruction Decode Unit (IDU) 208 shown in FIGS. 2 and 3 and performs the Instruction Decode and Dispatch process shown in FIG. 11 (this is also described in previously-cited U.S. Pat. No. 6,598,152, granted Jul. 22, 2003. The process in FIG. 11 may precede in parallel with the process in FIG. 9. When the process in FIG. 9 is completed, the process goes to the entry point C in FIG. 10.

When the process in FIG. 11 is entered, operation 1101 is performed to determine if a "fetch group" was forwarded by the instruction fetch unit (IFU) and if it is the "fetch group" identified in the current IFAR cycle (i.e. addressed by the current IFAR setting). If the test by operation 1101 finds no "fetch group" has been forwarded for the current IFAR cycle, the "no" path is taken to the exit the process in FIG. 11.

However if the test by operation 1101 finds the "fetch group" is for the current IFAR cycle, the "yes" path is taken to operation 1102, which is performed by IDU 208, which then forms one or more "dispatch groups" from the received "fetch group" following the rules of dispatch group formation. (These rules are: Not more than five instructions per group, At most one branch instruction in each dispatch group, and The fifth slot in the dispatch group is reserved for branch instructions only and if there is not enough instructions to fill all the slots in the dispatch group which have inserted NOPs).

Then operation 1103 obtains an invalid entry in the Global Completion Table (GCT) in 209 shown in FIG. 2 and fill its fields with the information for the dispatch group and validates the entry.

Figure 12:
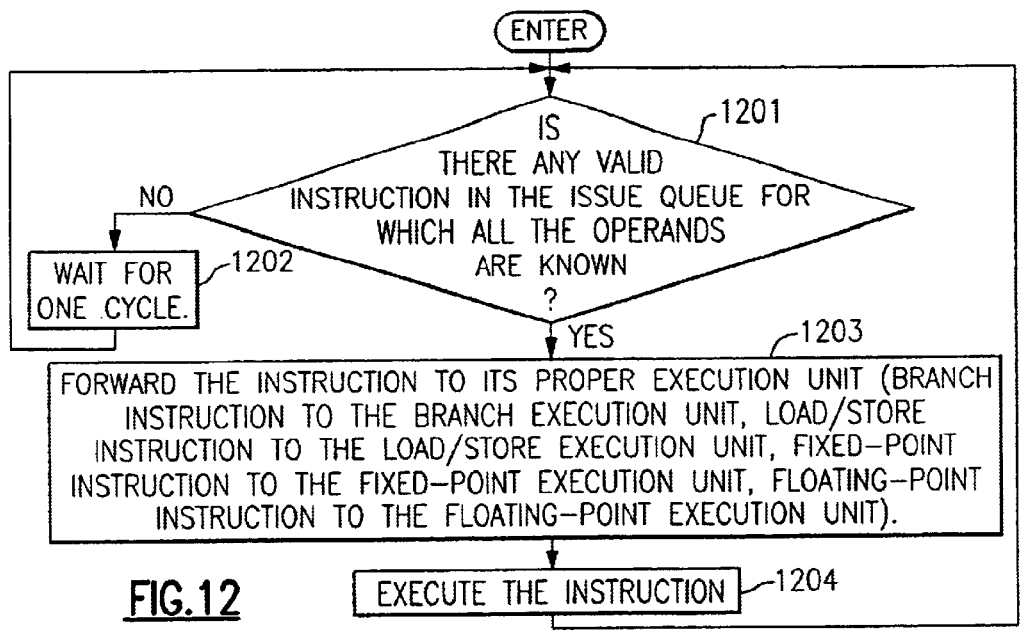
FIG. 12 shows a flow diagram of an Instruction Issue and Instruction Execution subprocess used in FIG. 9.

Finally, operation 1103 places each of the instructions in the "dispatch group" in the issue queue, and makes it available to the process shown in FIG. 12 for operation 926.

The FIG. 12 process is done by the Branch Issue Queue 314 and Branch Execution Logic unit 217A with outputs 316A and 316B shown in FIG. 3. In FIG. 12 the process performs Instruction issue and instruction execution operations, in which operation 1201 is entered. Operation 1201 determines if there is any valid Instruction in the Issue Queue for which all the operands are known? If "no", the process waits one cycle an then again performs operation 1201 until a valid instruction is detected in the Issue Queue for which all operands are known.

Operation 1203 is entered from the "yes" path from operation 1201. Then, operation 1203 forwards the detected Instruction to its proper execution unit 217A–217D, which is one of the execution units shown in the Instruction Execution Units (IEU) 217 in FIG. 2, which involves sending a branch instruction to the branch execution unit 217A, a load/store instruction to the load/store execution unit 217D, a fixed-point instruction to the fixed-point execution unit 217B, and a floating-point instruction to the floating-point execution unit 217C. When the respective execution unit receives an instruction, it executes the instruction.

Operation 1203 forwards the instruction to its proper execution unit in the instruction execution unit 217 in FIG. 2, and then operation 1204 executes the instruction. The process in FIG. 12 then goes back to operation 1201 to repeat its operations for another valid instruction in the issue queue.

When operation 1203 forwards a conditional branch instruction to the branch execution logic 217A, it determines if the actual "branch taken/not taken" path is the same as the predicted "branch taken/not taken" path made by the BHT bit prediction for this instruction. If the actual and predicted are the same, the process in FIG. 10 continues the predicted instruction stream. But if the determination finds they are not the same, then the target instruction selected in the predicted instruction stream is in error, and the execution results of that branch target execution, and of all of its following instruction executions, must be flushed (eliminated) from the execution results for the current program, and they must be replaced by executing the instructions beginning with the actual target instruction determined by the actual execution of the wrongly predicted branch instruction.

In FIG. 10, operation 1001 determines if the current instruction is being executed in the current cycle is a branch instruction. If no branch instruction is being executed, the program execution sequence is not affected; then the "no" path is taken to operation 1002, which occurs for most instructions in a program. But if the currently executing instruction is a branch instruction, the "yes" path is taken to operation 1003.

When the "no" path is taken from operation 1001 to operation 1002, operation 1002 determines if any non-branch flush signal has been received. Mostly non-flush signals are not received because the predictions are correct, and the "no" path is taken to operation 1002 which sets the IFAR to the "predicted_IFAR" address value. Then the subprocess in FIG. 10 is ended, and the process goes to FIG. 8 entry point A.

However, if the "yes" path is taken from operation 1005 to operation 1006, operation 1006 sets IFAR to the non-branch flush address received. Then the subprocess in FIG. 10 is ended, and the process goes to FIG. 8 entry point A.

When a branch instruction is being executed, operation 1003 is performed using the Branch Information Queue (BIQ) hardware in FIG. 4, and the operation reads the current BHT bit 403 and the Predicted Address 402 (for predicting the outcome of the currently executed branch instruction) in the current BIQ entry in BIQ 313. Then, operation 1003 determines if the branch instruction is mispredicted by finding if the valid bit 404 indicates the invalid state, or the actual target address is different from the predicted address 402. That is, the predicted and actual addresses are compared, and if they do not have the same value, this branch instruction has a misprediction; then operation 1003 takes its "yes" path to operation 1007.

The usual case for operation 1003 is to find no misprediction (i.e. the compared predicted and actual addresses have the same value), and then the "no" path is taken to operation 1004. Operation 1004 sets IFAR to the "Predicted IFAR" value, which is the address of the target instruction of this executed branch instruction. Then operation 1011 is entered, and the BIQ entry is released for this executed branch instruction by setting its BIQ valid bit 404 to "0" state. The subprocess in FIG. 10 is ended, and it goes to FIG. 8 entry point A.

However, when the "yes" path from operation 1003 to 1007 is taken, a determination is made if the prediction by BHT bit 403 is correct. It is possible for the state of BHT bit 403 to be correct and for a misprediction to nevertheless exist. If operation 1007 finds the BHT bit prediction is not correct, operation 1012 is entered. But if operation 1007 finds the BHT bit prediction is correct, operation 1017 is entered.

If the BHT bit prediction is correct, and operation 1017 is entered, then operation 1017 sets "Execution IFAR" to the target address of the branch instruction, and sets IFAR to the "Execution IFAR" value, and flushes all instructions from the instruction pipeline following the current branch instruction. Finally, operation 1021 releases the BIQ entry for the executed branch instruction by setting its valid bit to the "0" state. The process then goes to FIG. 8 entry point A.

But if operation 1007 finds the BHT bit prediction is not correct, operation 1012 is entered to determine if the branch outcome is "taken". If "taken", operation 1014 sets "the "Execution IFAR" value to the target address of the branch instruction. If "not taken", operation 1016 sets the "Execution IFAR" value to the value obtained by adding 4 to the "Address of the branch" field in the BIQ entry for the executed branch to generate the address of the next sequential instruction in the program.

When performed, each operation 1014 or 1016 enters operation 1018, which sets IFAR to the "Execution IFAR" value, and the execution results obtained for all instructions following the branch are flushed from instruction pipeline.

Then, operation 1019 sets a BHT_write_addr register 318 to the "address of the branch" field obtained from the BIQ entry for the executed branch. The BHT_write_data is set to 1, if the branch outcome is "taken", else it is set to 0, and this value is written over the current BHT bit in the BHT to insure that it is corrected.

The next operation 1021 is then performed, and it releases the BIQ entry for the executed branch instruction by setting its valid bit to the "0" state. The process then goes to FIG. 8 entry point A to repeat its operation which has been previously described herein.

While I have described the preferred embodiment of my invention, it will be understood that those skilled in the art, both now and in the future, may make various improvements and enhancements which fall within the scope of the claims, which follow. These claims should be construed to maintain the proper protection for the invention first disclosed here.

What is claimed is:

1. A branch prediction process for a computer system for improving branch prediction rates when using a branch history table (BHT), comprising:

determining if a program instruction processor has an access hit (hit) or access miss (miss) in an instruction cache (I-cache) when utilizing an instruction address (IFAR address) in attempting to select a program instruction for execution by the program instruction processor, generating a hint instruction when the program instruction is a branch in response to a hit occurring during the determining operation, storing the hint instruction in association with a copy of a program instruction line containing the program instruction in a storage hierarchy of the computer system, the hint instruction storing BHT prediction fields obtained from a copy of a current BHT entry associated with the program instruction line when the hit occurs, and storing a branch mask in the hint instruction for locating the program instruction in the program instruction line, and transferring the copy of the program instruction line and associated hint instruction from the storage hierarchy to the I-cache in response to a miss occurring during the determining operation, and executing the hint instruction to restore a BHT prediction field in said current BHT entry to the state of a BHT field in the hint instruction located by the branch mask, and the generating operation of generating hint instructions being performed by a hint processor operating in parallel with the program instruction processor, and executing a hint instruction when the hint instruction is received in the I-cache by testing an operation code field in the hint instruction to determine if a completed hint instruction is indicated or if a no-operation state is indicated for the hint instruction, and continuing the executing process only if a completed hint instruction is indicated by performing the following operations:

reading a BHT entry in the BHT located at an index determined by a bht_index field in the hint instruction, and storing the BHT entry in a curr_bht register, logically ANDing an Nth bit in an inversion of a branch_mask field in the hint instruction with an Nth bit in the curr_bht register, where N is the bit position of current instruction in the program instruction line, and logically ANDing the Nth bit in the branch_mask field with an Nth bit in a bht_bits field in the hint instruction, logically ORing outputs of the two logical ANDing operations to provide an Nth bit output, and setting an Nth bit in a new_bht register to the Nth bit output, receiving without change in the new_bht register at bit locations other than at the Nth bit location the bits in the curr_bht register at corresponding bit locations other than the Nth bit location, and setting contents of the new_bht register into the current BHT entry in the BHT to restore the BHT entry to its last prediction state for the current instruction.

2. The branch prediction process for a computer system for improving branch prediction rates when using a branch history table as defined by claim 1, further comprising:

performing all of the hint instruction operations in a hint instruction processor.

3. The branch prediction process for a computer system for improving branch prediction rates when using a branch history table as defined by claim 2, further comprising:

performing all hint instruction operations and all program instruction processor operations in a single semiconductor chip.

* * * * *